United States Patent
Law et al.

(10) Patent No.: US 12,160,406 B2
(45) Date of Patent: Dec. 3, 2024

(54) WHITELISTING FOR HART COMMUNICATIONS IN A PROCESS CONTROL SYSTEM

(71) Applicant: FISHER-ROSEMOUNT SYSTEMS, INC., Round Rock, TX (US)

(72) Inventors: Gary K. Law, Georgetown, TX (US); Sergio Diaz, Pflugerville, TX (US); Godfrey R. Sherriff, Austin, TX (US); Marcos Peluso, Chanhassen, MN (US); Scott N. Hokeness, Lakeville, MN (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 331 days.

(21) Appl. No.: 17/022,888

(22) Filed: Sep. 16, 2020

(65) Prior Publication Data

US 2021/0092097 A1  Mar. 25, 2021

Related U.S. Application Data

(60) Provisional application No. 62/904,229, filed on Sep. 23, 2019.

(51) Int. Cl.
*H04L 9/40* (2022.01)
*G05B 19/042* (2006.01)

(52) U.S. Cl.
CPC ........ *H04L 63/0245* (2013.01); *G05B 19/042* (2013.01); *H04L 63/0209* (2013.01); *G05B 2219/25187* (2013.01)

(58) Field of Classification Search
CPC . H04L 63/02; H04L 63/0209; H04L 63/0245; G05B 19/042; G05B 2219/25187
See application file for complete search history.

(56) References Cited

U.S. PATENT DOCUMENTS 10,341,293 B2 * 7/2019 Koniki ............... H04L 67/10
10,462,187 B2 * 10/2019 Locke ............... H04L 63/1425
(Continued)

FOREIGN PATENT DOCUMENTS

CN  103561403 A  2/2014
CN  104521219 A  4/2015
(Continued)

OTHER PUBLICATIONS

Search Report for Application No. GB2014883.9, dated Feb. 23, 2021.
(Continued)

*Primary Examiner* — Linglan Edwards
(74) *Attorney, Agent, or Firm* — MARSHALL, GERSTEIN & BORUN LLP

(57) ABSTRACT

A cybersecurity system for use in a process plant provides whitelisting of device specific and common practice HART read commands in process controllers and safety controllers to perform communications in a process plant that are very secure, but that still enable the implementation of advanced functionality provided in HART devices. A whitelist implementation application applies one or more whitelists in a security gateway device to determine if messages, such as HART messages, should be allowed or processed. A whitelist learning application automatically creates and configures whitelists, and a whitelist configuration application discovers Device Specific and Common Practice HART commands by issuing device description requests to specific devices, parsing the response, and communicating the whitelist configuration information with the parsed command types to the relevant process controllers and safety controllers for use in the whitelists. A user interface enables users to interact with and guide the configuration process.

29 Claims, 11 Drawing Sheets

(56) References Cited

U.S. PATENT DOCUMENTS

| | | | |
|---|---|---|---|
| 10,698,498 B2* | 6/2020 | Silva Arce | H04L 63/101 |
| 2004/0148513 A1* | 7/2004 | Scott | G05B 23/027 |
| | | | 726/26 |
| 2012/0078896 A1* | 3/2012 | Nixon | G06F 16/90 |
| | | | 707/732 |
| 2013/0054765 A1* | 2/2013 | Baret | G05B 19/0423 |
| | | | 709/220 |
| 2013/0287208 A1 | 10/2013 | Chong et al. | |
| 2014/0137190 A1* | 5/2014 | Carey | G06F 21/577 |
| | | | 726/25 |
| 2014/0208107 A1* | 7/2014 | Kelly | G06F 21/51 |
| | | | 713/168 |
| 2015/0365379 A1* | 12/2015 | Wu | H04L 63/0245 |
| | | | 726/14 |
| 2017/0093887 A1* | 3/2017 | Schwartz | H04L 63/1425 |
| 2018/0027071 A1* | 1/2018 | Toepke | H04L 67/12 |
| | | | 709/217 |
| 2018/0176186 A1* | 6/2018 | Chao | H04L 63/1425 |
| 2018/0241719 A1* | 8/2018 | Koniki | H04L 63/0245 |
| 2018/0352436 A1* | 12/2018 | Spiegel | H04L 63/0823 |
| 2019/0207944 A1 | 7/2019 | Caffrey et al. | |

FOREIGN PATENT DOCUMENTS

| | | |
|---|---|---|
| CN | 105939334 A | 9/2016 |
| CN | 107544470 A | 1/2018 |
| JP | 2004-234655 A | 8/2004 |
| JP | 2016-220213 A | 12/2016 |

OTHER PUBLICATIONS

Office Action and Search Report for Chinese Patent Application No. 202011012558.3, dated Oct. 21, 2023.

Japanese Patent Application No. 2020-157088, Office Action, mailing date May 21, 2024.

\* cited by examiner

WHITELISTING FOR HART COMMUNICATIONS IN A PROCESS CONTROL SYSTEM

RELATED APPLICATION

This application claims the benefit of U.S. Provisional Patent Application No. 62/904,229 filed on Sep. 23, 2019, and entitled "Whitelisting for HART Communications in a Process Control System," the entirety of each of which is hereby expressly incorporated herein by reference.

FIELD OF TECHNOLOGY

The present invention relates generally to process control systems and safety systems used in process plants and, more particularly, to performing cybersecurity in a combined process control and safety system.

DESCRIPTION OF THE RELATED ART

Process control systems, like those used in chemical, petroleum or other processes, typically include one or more process controllers communicatively coupled to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process plant such as opening or closing valves and measuring process parameters. The process controllers receive signals indicative of process measurements made by the field devices and/or other information pertaining to the field devices, use this information to implement control routines and then generate control signals which are sent over the buses to the field devices to control the operation of the process. Information from the field devices and the controllers is typically made available to one or more applications executed by the operator workstation to enable an operator to perform any desired function with respect to the process, such as configuring the process, viewing the current state of the process, modifying the operation of the process, etc.

In some process systems, a separate safety system may be provided to detect significant safety related problems within the process plant and to automatically close valves, remove power from devices, switch flows within the plant, etc. when a problem occurs which might result in or lead to a serious hazard in the plant, such as a spill of toxic chemicals, an explosion, etc. These safety systems typically include one or more separate input/output (I/O) devices that have controllers, apart from the process control controllers, which are connected to safety field devices via separate buses or communication lines disposed within the process plant. The safety controllers use the safety field devices to detect process conditions associated with significant events, such as the position of certain safety switches or shutdown valves, overflows or underflows in the process, the operation of important power generation or control devices, the operation of fault detection devices, etc. to thereby detect "events" within the process plant. When an event is detected, the safety controller takes some action to limit the detrimental effect of the event, such as closing valves, turning devices off, removing power from sections of the plant, etc.

There have, in the past, been attempts to integrate data from the process control and safety systems in the same plant on the same user interface to thereby provide the viewing of and manipulation of this different data at the same location through an integrated control and safety system (ICSS). One of the most common methods for getting information from field devices in an ICSS is the Highway Addressable Remote Transmitter (HART®) communication protocol, and one of the most common methods for getting information to field devices through an ICSS is through the use of pass-through communications of HART commands.

The HART communication protocol commands are classified into specific groups. Specifically, the HART communication protocol defines Universal Commands, which all devices using the protocol must recognize and support, Common Practice Commands, which are recognized and supported by some but not all HART communication devices, and Device Specific Commands, which represent functions that are unique to each field device. The majority of HART commands can be further classified as read or write commands. Generally, read commands read information from field devices, while write commands change either an internal setting or a physical state of the field device. Device Specific Commands are defined by and are rendered useful by a formal description of the operating procedures of a device called a device description. Device descriptions are generally created by and provided by the device manufacturer and can be used to discover the Common Practice and Device Specific commands specific to any field device.

Device descriptions are typically gathered or collected by an asset management system (ASM) or a configuration system of process plants during field device installation. The system may issue a "command zero" to retrieve this device description from a database or other device description repository. Moreover, device descriptions, which may be stored in an unchanged format in configuration databases, may be parsed first and then stored. For example, device descriptions may be parsed for device variables, device commands and device menus, and each parsed segment may be stored separately. Device descriptions and their subfields are typically accessible for reading by other devices in a process plant.

Sometimes there is a need for a higher level security in an ICSS implementing HART communication protocol. For this purpose, safety logic solvers and controllers typically have some type of hardware key to prevent or enable a higher level of security, and in some cases, this higher level of security has been used to block certain HART commands instead of forwarding these commands to the devices connected to the safety logic solvers and controllers. Some methods of high ICSS security include blocking all commands, such as HART commands, to the safety system field devices. However, this approach is inflexible and so does not allow commands that are not of a dangerous nature to continue being forwarded. Still other methods of high ICSS security include allowing all read Universal Commands. Unlike blocking all commands, this method does allow certain messages that are not dangerous to continue being forwarded (specifically, read Universal Commands). Generally, read commands are considered safe, as they by nature do not change the state of devices in a process plant. Instead, these read commands merely request current values of data fields. Write commands, by contrast, can be used maliciously to put the process plant and individuals in the plant in danger. This current method of providing security within a safety system by blocking all HART commands except read only Universal Commands takes advantage of the safe nature of the read only Universal Commands of the HART protocol to provide coarse-grained blocking of potentially dangerous messages while allowing read Universal Commands. However, this method blocks and/or drops all the safe read commands outside of the limited set of Universal Commands. In other words, all the Common Practice read commands and all the Device Type read commands, which are generally considered safe, still get blocked by this method. As a result, control and safety systems that employ high levels of security, such as any of the blocking methods described above, make it difficult if not impossible to take advantage of the multitude of diagnostics and other ancillary functionality of HART devices used in the safety system by not enabling reads of data provided by device functionality not defined by the Universal Commands of the HART protocol, thus making these methods far less effective in ongoing processes. Thus, existing methods lack the fine-grained specificity to accommodate the need for providing a large range of advanced diagnostic and device information while delivering the proper level of security.

SUMMARY

A process plant includes a whitelist configuration application that enables a user to securely configure a safety logic solver or a process controller to deliver an appropriate level of security while also accommodating the need to transmit a large amount of information between the safety system devices and one or more supervisor or support applications, such as configuration, asset management, etc. applications. In one embodiment, when a safety logic solver is set at a certain level of security (e.g. a hardware key is set in the inhibit position, resulting in a higher or a highest level of security), the communication interface of the safety logic solver may respond to receiving a message by executing a whitelist execution application that has been configured on the device. The whitelist execution application may access one of a plurality of whitelists stored in memory, based in part on the current security level and the configuration information. Then, the whitelist execution application may compare the command type of the message to the command types in the selected whitelist. If there is no match, the application may block the message, which may include not forwarding the message to a safety system field device, such as in a pass-through communication schema, and may include notifying process plant operators or other users. If there is a match in the whitelist, the application may perform the standard operation, which may include accessing and executing one or more logic modules, and may include forwarding the message to the desired device.

Moreover, a whitelist learning application may provide a system and method for performing automatic whitelist configuration for both the process control system and the safety system. In particular, a whitelist learning application may enable a user to build one or more whitelist configurations for one or more safety logic solvers (also known as safety controllers) and/or process controllers by putting the one or more controllers in a learn mode, wherein the learn mode extracts the command types of incoming commands and builds whitelists based on the security level of the controller (and optionally based on the destination of the command). When the controllers are switched back into a lock mode, the whitelist learning application stores the whitelists it has built in the whitelist execution application for future command processing.

Additionally, a whitelist configuration application provides another system and method for performing automatic whitelist configuration, using an interface. In particular, a whitelist configuration application may enable a user to build a whitelist configuration for a safety logic solver or process controller and may store the whitelist configuration in the desired gateway device with varying degrees of automation. In one embodiment, the whitelist configuration application coordinates with a configuration database to read and parse a device description of an installed field device to determine the Device Specific and Common Practice read commands of that field device. Then, the whitelist configuration application generates and configures one or more whitelists composed of some or all of the device specific and common practice read messages and configures the appropriate process controller or safety logic solver to process incoming messages using one or more of the created whitelists.

DETAILED DESCRIPTION

Figure 1:
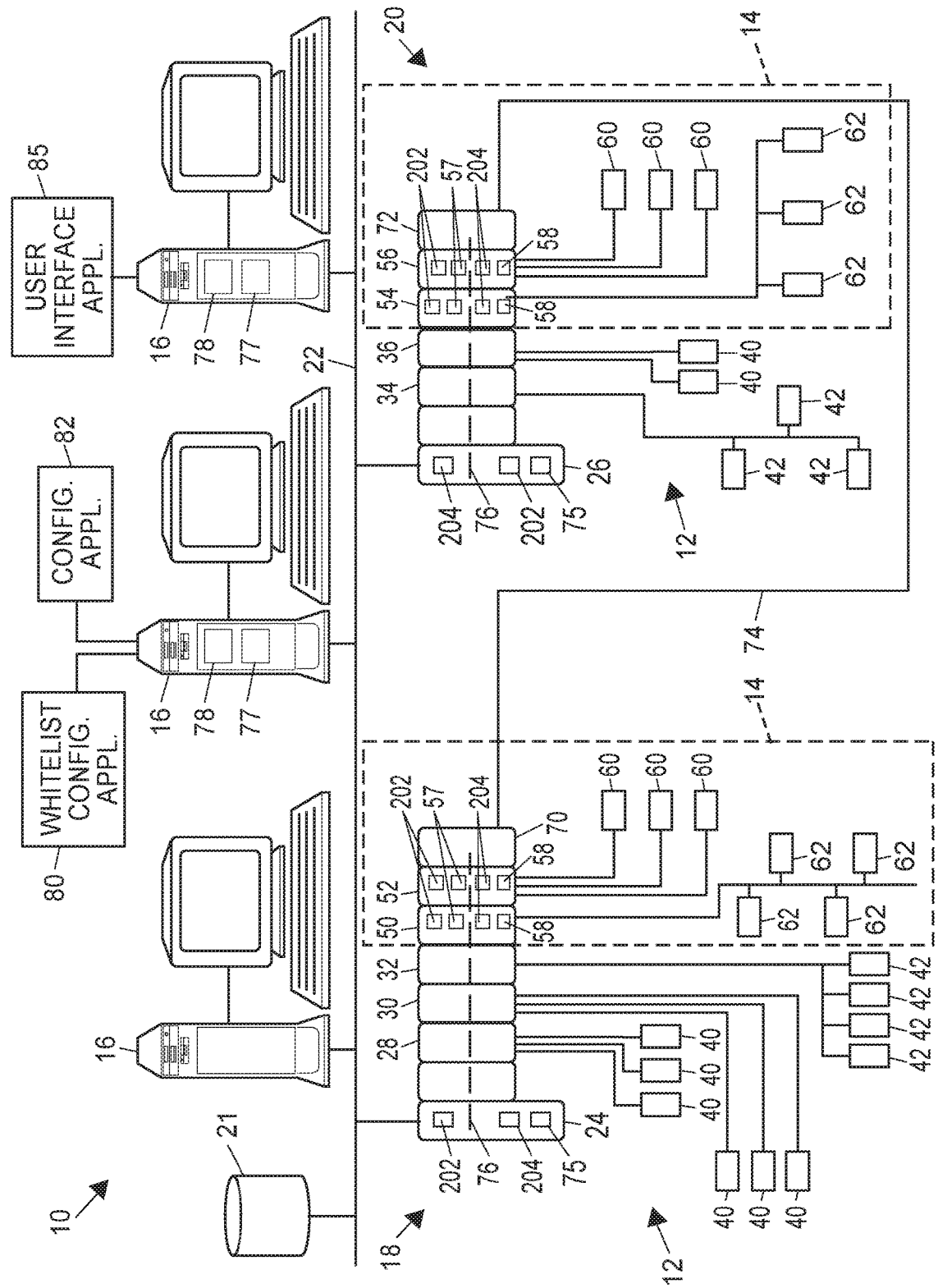
FIG. 1 is a block diagram of an exemplary process plant having a safety system integrated with a process control system and including one or more interface, whitelist configuration and whitelist execution applications that provide integrated security, configuration and diagnostic activities with respect to the process control system and safety system.

FIG. 1 generally illustrates a process plant 10 that implements a combined process control and safety system and that is configured to include a set of whitelist components or applications that provide for a high level of cybersecurity in the plant 10 while still enabling the use of the higher level functionality of the various field devices, and in particular, HART field devices, within the plant 10. Generally, the whitelist components or applications include one or more whitelist execution applications that operate to securely process messages, e.g., HART messages or commands, as these messages are received by security gateway devices, such as logic solvers and process controllers, by performing analysis on the incoming signals in the form of comparing the command types of the messages against one or more stored whitelists to determine if the message can be passed through to a sub-system device. The whitelist components also include one or more whitelist configuration applications that enable a user to securely set up, create, edit, download and configure the whitelist execution application and the whitelists used thereby, for any of a number of security gateway devices.

Generally, the example process plant 10 of FIG. 1 includes a process control system 12 integrated with a safety system 14 (indicated by dotted lines), which generally operates as a Safety Instrumented System (SIS) to monitor and override the control provided by the process control system 12 to maximize the likely safe operation of the process plant 10. The process plant 10 also includes one or more host workstations, computers or user interfaces 16 (which may be any type of personal computers, workstations, etc.) that are accessible by plant personnel, such as process control operators, maintenance personnel, configuration engineers, etc. These workstations host and execute a whitelist configuration application 80. In the example illustrated in FIG. 1, three user interfaces 16 are shown as being connected to two separate process control/safety control nodes 18 and 20 and to a configuration database 21 via a common communication line or bus 22. The communication network 22 may be implemented using any desired bus-based or non-bus based hardware, using any desired hardwired or wireless communication structure and using any desired or suitable communication protocol, such as an Ethernet protocol.

As will be understood, each of the nodes 18 and 20 of the process plant 10 includes both process control system devices and safety system devices connected together via a bus structure that may be provided on a backplane into which the different devices are attached. The node 18 is illustrated in FIG. 1 as including a process controller 24 (which may be a redundant pair of controllers) as well as one or more process control system input/output (I/O) devices 28, 30 and 32 while the node 20 is illustrated as including a process controller 26 (which may be a redundant pair of controllers) as well as one or more process control system I/O devices 34 and 36. Each of the process control system I/O devices 28, 30, 32, 34 and 36 is communicatively connected to a set of process control related field devices, illustrated in FIG. 1 as field devices 40 and 42. The process controllers 24 and 26, the I/O devices 28-36 and the process control field devices 40 and 42 generally make up the process control system 12 of FIG. 1. Additionally, as discussed in more detail below, the process controllers 24 and 26 may store and execute one or more whitelist execution applications 202 and/or whitelist learning applications 204 in a memory 75 to securely process messages which are destined for field devices 40 and 42.

Likewise, the node 18 includes one or more safety system logic solvers 50 and 52, while the node 20 includes safety system logic solvers 54 and 56. Each of the logic solvers 50-56 is an I/O device (also variously referred to as a safety controller) having a processing unit 57 that may execute safety logic modules and a whitelist execution application 202 stored in a memory 58, and these devices are communicatively connected to provide control signals to and/or receive signals from safety system field devices 60 and 62. Additionally, each of the nodes 18 and 20 may include at least one message propagation device (MPD) 70 or 72, which are communicatively coupled to each other via a ring type bus connection 74 (only a portion of which is illustrated in FIG. 1). The safety system logic solvers 50-56, the safety system field devices 60 and 62, the MPDs 70 and 72 and the bus 74 generally make up the safety system 14 of FIG. 1. As will be understood, the safety system logic solvers 50-56 may store the aforementioned whitelist execution application 202 and/or the whitelist learning application 204 in a memory 58 to securely process messages destined for safety system field devices 60 and 62.

The process controllers 24 and 26, which may be, by way of example only, DeltaV™ controllers sold by Emerson Process Management or any other desired type of process controllers, are programmed to provide process control functionality (using what are commonly referred to as control modules) using the I/O devices 28, 30 and 32 (for the controller 24), the I/O devices 34 and 36 (for the controller 26) and the field devices 40 and 42. In particular, each of the controllers 24 and 26 implements or oversees one or more process control routines (also referred to as control modules) stored in a memory 75 or otherwise associated therewith and communicates with the field devices 40 and 42 and the workstations 14 to control the process 10 or a portion of the process 10 in any desired manner. The process controllers 24 and 26 may also store and execute the whitelist execution application 202 and/or the whitelist learning application 204 to perform security checks on messages being sent to the process control or safety systems before or during the execution of the one or more process control routines stored in a memory 75. The field devices 40 and 42 may be any desired types of field devices, such as sensors, valves, transmitters, positioners, etc., and may conform to any desired open, proprietary or other communication or programming protocol including, for example, the HART or the 4-20 ma protocol (as illustrated for the field devices 40), any fieldbus protocol such as the FOUNDATION® Fieldbus protocol (as illustrated for the field devices 42), or the CAN, the Profibus, or the AS-Interface protocols, to name but a few. Similarly, the I/O devices 28-36 may be any known types of process control I/O devices using any appropriate communication protocol(s).

The safety logic solvers 50-56 of FIG. 1, which may be any desired type of safety system control devices, include a processor 57 and a memory 58 that stores safety logic modules to provide control functionality associated with the safety system 14 using the safety field devices 60 and 62. The memories 58 of safety logic solvers 50-56 may store the whitelist execution application 202 and/or the whitelist learning application 204 adapted to be executed on the processor 57 before or during the execution of the safety logic modules. Of course, the safety field devices 60 and 62 may be any desired type of field devices conforming or using any known or desired communication protocol, such as those mentioned above. In particular, the field devices 60 and 62 may be safety-related field devices of the type that are conventionally controlled by a separate, dedicated safety-related control system. In the process plant 10 illustrated in FIG. 1, the safety field devices 60 are depicted as using a dedicated or point-to-point communication protocol, such as the HART or the 4-20 ma protocol, while the safety field devices 62 are illustrated as using a bus communication protocol, such as a Fieldbus protocol. Typically, the safety devices including both of the safety system logic solvers (controllers) 50-56 and the safety system field devices 60 and 62 used as part of the safety system 14 will be rated as safety devices, which typically means that these devices must go through a rating procedure to be rated by an appropriate body as a safety device.

A common backplane 76 (indicated by a dotted line through the controllers 24, 26, the I/O devices 28-36, the safety logic solvers 50-56 and the MPDs 70 and 72) is used in each of the nodes 18 and 20 to connect the controllers 24 and 26 to the process control I/O cards 28, 30 and 32 or 34 and 36, as well as to the safety logic solvers 52 and 54 or 56 and 58 and to the MPDs 70 or 72. The controllers 24 and 26 are also communicatively coupled to, and operate as a bus arbitrator for the bus 22, to enable each of the I/O devices 28-36, the logic solvers 52-56 and the MPDs 70 and 72 to communicate with any of the workstations 16 via the bus 22.

As will be understood, the processors 57 and the memories 58 of safety logic solvers 50-56 and the processors and memories 75 of process controllers 24 or 26 of FIG. 1 enable the use and configuration of the whitelist execution applications 202 which stores whitelists of, for example, HART commands and the whitelist learning application 204 (if desired).

Referring again to FIG. 1, the process plant 10 is configured to provide users with the ability to configure the whitelist execution applications 202 of the safety controllers 50-56 and process controllers 24 and 26. Specifically, one or more of the workstations 16 includes a processor 77 and a memory 78 that may store any number of user interface, configuration, whitelist, diagnostic and/or viewing applications adapted to be executed on the processor 77. A whitelist configuration application 80 and a process plant configuration application 82 are illustrated in an exploded view in FIG. 1 as being stored in one of the workstations 16 while a user interface or display application 85 is illustrated as being stored in a second one of the workstations 16. However, if desired, these applications could be stored and executed in different ones of the workstations 16 or in other computers associated with the process plant 10. Generally speaking, the whitelist configuration application 80 provides whitelist configuration information to a configuration engineer to configure some or all elements of the whitelist functionality included in process plant 10. As part of the configuration activities performed by the whitelist configuration application 80, the configuration engineer may create new whitelists, may edit and remove existing whitelists and may download these different whitelist configurations to the appropriate whitelist execution applications 202 of the process controllers 24 and 26, and the safety logic solvers 50-56 via the bus 22 and controllers 24 and 26.

Generally speaking, the process plant configuration application 82 provides process plant configuration information to a configuration engineer to configure some or all elements of the process plant 10, some elements of which may be involved in whitelist execution, and to store that configuration in the configuration database 21. As part of the configuration activities performed by the configuration application 82, the configuration engineer may create control routines or control modules for the process controllers 24 and 26, may create safety logic modules 58 for any and all of the safety logic solvers 50-56 and may download these different process control modules and safety modules to the appropriate ones of the process controllers 24 and 26 and the safety logic solvers 50-56 via the bus 22 and controllers 24 and 26, so as to control the behavior of the safety logic solvers 50-56 and the process controllers 24 and 26 during processing of commands, outside of or aside from whitelist execution.

Figure 2:
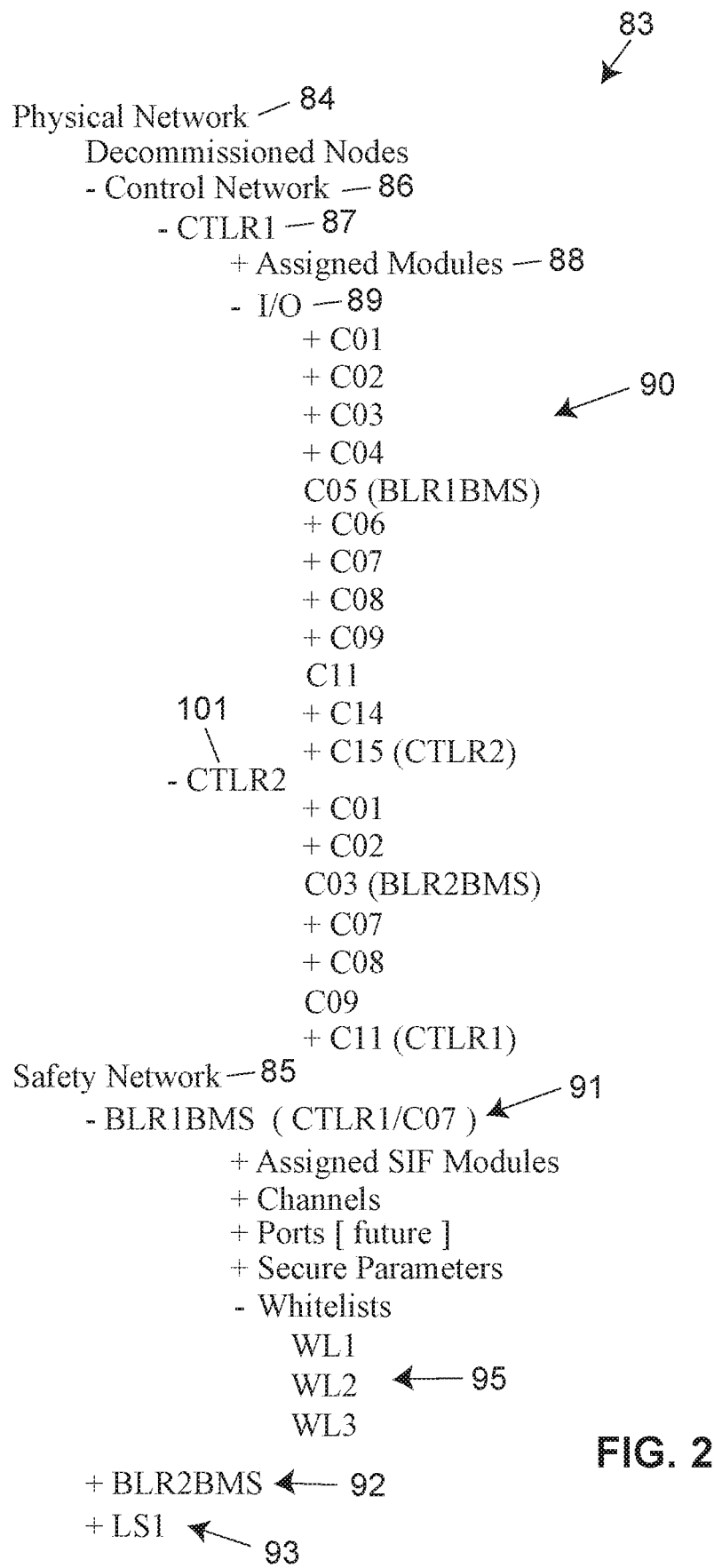
FIG. 2 is an example screen display, illustrating a configuration view of the process plant of FIG. 1 showing both the process control system devices and safety system devices.

FIG. 2 illustrates an exemplary display screen 83 that demonstrates the hierarchy and relationships between devices and modules within the process plant 10 that may utilize whitelist execution applications 202 to ensure secure transmission of messages between the various devices in the plant 10. The display screen 83 may be generated by the configuration routine 82 of FIG. 1, for example, or by an operator interface application illustrating a plant configuration. As illustrated in the display screen 83, the process plant 10 includes a physical network section 84 which displays the physical interconnections of the devices within the process plant 10 and a safety network section 85 which displays safety system devices. The physical network section 84 includes a control network 86 which include a set of controllers including a controller 87 (named CTLR1) and a controller 101 (named CTLR2). The controller 87, which may be one of the controllers 24, 26 of FIG. 1, includes a set of assigned modules 88 which are control modules stored in and executed by the controller 87 and an I/O devices section 89 connected to the controller 87 for communication purposes. The I/O devices section 89 is expanded to illustrate all of the I/O cards 90 connected to the controller 87 (CTLR1) via one of the backplanes 76 of FIG. 1. In this example, the I/O devices section 89 includes process control input/output cards C01-C09, C11, C14 and C15 (referred to collectively by the number 90). Each of these cards may be expanded to illustrate the identity of and other information associated with the different field devices (which are individual ones of the field devices 40 and 42 of FIG. 1) connected to each of these cards. The controller 87 (CTLR1) may, for example, implement a whitelist execution application to ensure protection of its associated field devices.

The safety system 14 is illustrated in the safety network section 85 as including three safety logic solvers 91-93 named BLR1BMS, BLR2BM and LS1. The safety logic solver 91 is expanded to illustrate that it includes assigned safety modules, one or more channels (which are connected to safety field devices such as the devices 60 and 62 of FIG. 1) and secure parameters. The safety logic solver 91 (and/or the solvers 92 and 93) may similarly, for example, implement a whitelist execution application to ensure protection of its associated safety field devices. In these cases, one or more whitelists 95 may be illustrated in the configuration display 83 as being associated with (stored in and used by) the safety logic solvers 91, 92, 93.

The configuration display screen 83 of FIG. 2 illustrates the manner in which a configuration application 82 has configured the software (and hardware) associated with the different devices within the process plant 10 and can be used by a configuration routine engineer to create or alter the current configuration of the process plant 10 by downloading new configuration software to the devices within the process plant 10, including the process control system devices and the safety system devices. It may further display how the configuration information is stored in the configuration database 21 of FIG. 1. As will be understood, the whitelist configuration application 82 utilizes this information to configure whitelist execution applications 202 and the whitelists used thereby.

Figure 3A:
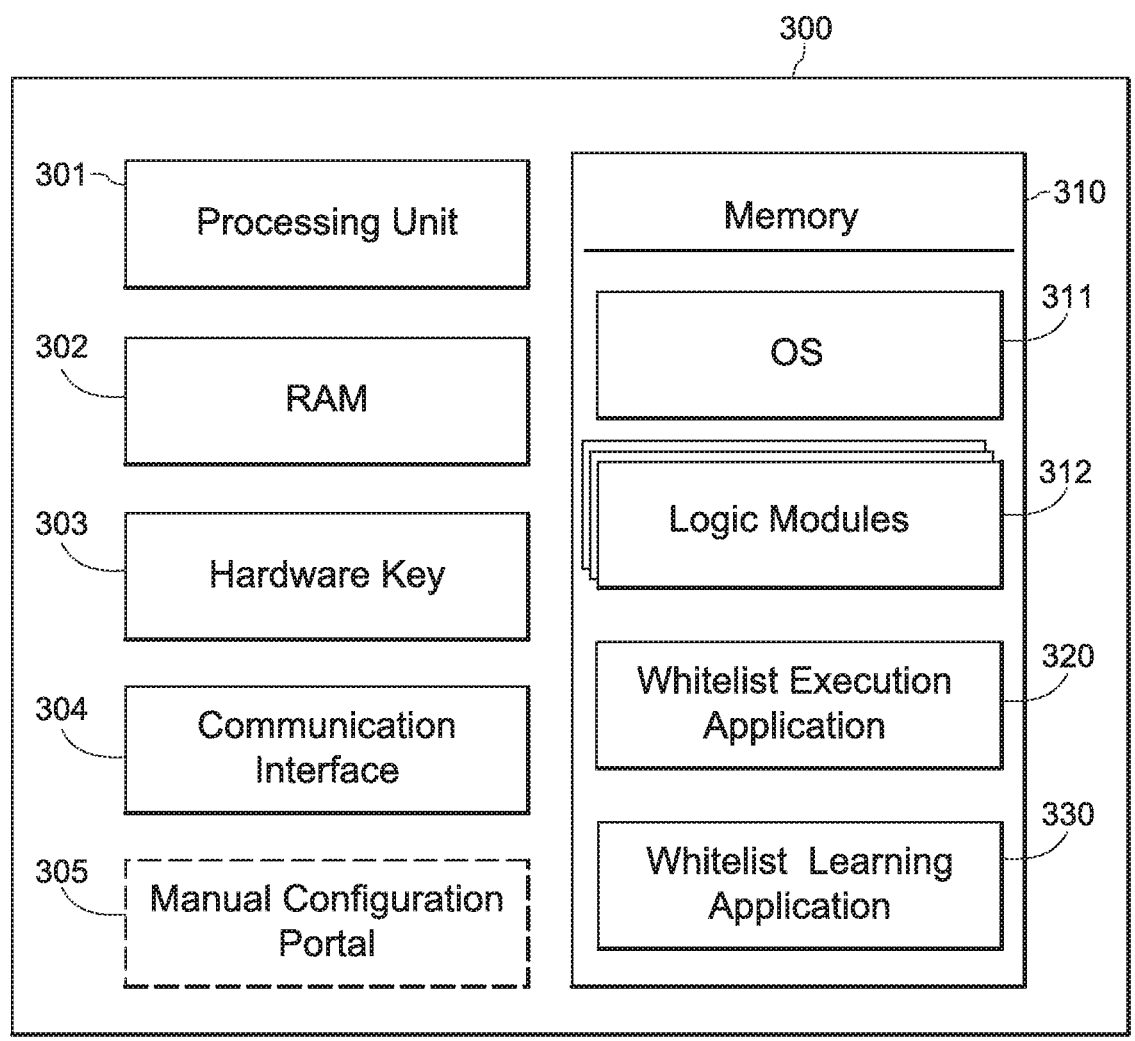
FIG. 3A is a block diagram of an example safety logic solver, schematically illustrated in FIG. 1.

FIG. 3A illustrates a block diagram of a device 300, which may be one of the safety logic solvers 50-56 of FIG. 1 or a process controller 24 and 26 of FIG. 1, that implements, among other functions, a whitelist execution application 320 and a whitelist learning application 330. The device 300 is illustrated to include one or more processors or CPUs 301, a random-access memory (RAM) 302, a hardware key for setting a security level 303, a communication interface 304 to transmit and receive data via a local area network, wide area network, or any other suitable network, a manual configuration portal 305 and a memory 310 that stores various executable modules or data used by the device 300.

Generally the device 300 may communicate with field devices, I/O devices, the user workstations, and/or any other suitable computing device during operation of the process plant 10 of FIG. 1. The processor 301 may, among other functions, execute logic in the memory 310, where the executable logic involves processing commands that the device 300 receives via a communication network coupled to the communication interface 304. Some of the executable logic may depend on a state of a hardware key 303, indicating a security level.

Importantly, the memory 310 of FIG. 3A is illustrated as including an operating system 311 and a set of logic modules 312 that execute on the processing unit 301 to perform process control activities, such as safety system control and shut-down actions, as well as to process messages which have been received by the device 300 via the communication interface 304. The logic modules 312 may be the same as the aforementioned modules configured by a configuration engineer through the configuration application 80 of FIG. 1. The logic modules 312 may control how the device 300 responds to commands that have been received from a another controller or user interface device (such as any of those of FIG. 1) as well as to data or messages received from safety system or process control field devices connected to the device 300 via the interface 304. Still further, as illustrated in FIG. 3A, the memory 310 stores a whitelist execution application 320 and/or a whitelist learning application 330. Although the whitelist learning application 330 and the whitelist execution application 320 are illustrated as separate applications, their functionality may be combined into a single application.

Generally speaking, the whitelist execution application 320 (which may be any of the applications 202 of FIG. 1) executes on the processing unit 301 to perform as a cyber-security gateway for messages, such as HART messages, being sent to one or more field devices or other devices in a subnetwork connected to the device 300. More particularly, the whitelist execution application 320 decodes and analyzes incoming messages received via the communication interface 304 and intended for or addressed to devices (e.g., field devices) in the subnetwork, such as safety system field devices, to determine if this message can be sent to the intended device or, instead, if the message should be blocked. The whitelist execution application 320 may, for example, decode an incoming message and determine the command type (e.g., the HART command type) associated with the message. The whitelist execution application 320 may then compare this command type to the list of command types that are allowed to be sent to a device in the subnetwork as defined in one or more whitelists stored in the device 300. For example, if the command type is stored in an appropriate whitelist, the application 320 may allow the message to be forwarded to the device in the subnetwork (e.g., the field device) via the interface 304. However, if the command type is not stored in the appropriate whitelist, the application 320 will block the message from being sent to the device in the subnetwork via the interface 304 and may, instead, send a message to the transmitting device (i.e., the device that sent the message) indicating that the message has been blocked as not allowed. Still further, the whitelist execution application 320 may determine the appropriate whitelist to use for this functionality based on the setting of the hardware key 303, or based on other configuration data provided to the device 300 during configuration thereof, defining the level and types of security to provide based on various other factors, including the setting of the security level by, for example, the hardware key 303 (or a software key), the particular device or devices to which the messages are being sent, the operational state of the device 300 or the process plant in which the device 300 is used, etc.

Moreover, as will be described in more detail below, the whitelist learning application 330 may execute on the processing unit 301 to accept messages, learn about the messages and, in particular, the command types that are present in the messages, and to then generate one or more whitelists to be used by the whitelist execution application 320 based on this learning. In particular, the whitelist learning application 330 may operate in a safe mode (i.e., when the plant or process control network is known to be operating in a safe mode or environment) to learn the commands or command types (e.g., the HART commands) that are typically seen in messages being sent to the security gateway device, and may create one or more whitelists with these commands or command types therein. Thereafter, when the plant or security gateway device is set to a lock mode, the security gateway device may operate using the learned whitelists to determine which messages to allow to be processed in the gateway device or in a device in a subnetwork of the gateway device.

Figure 3B:
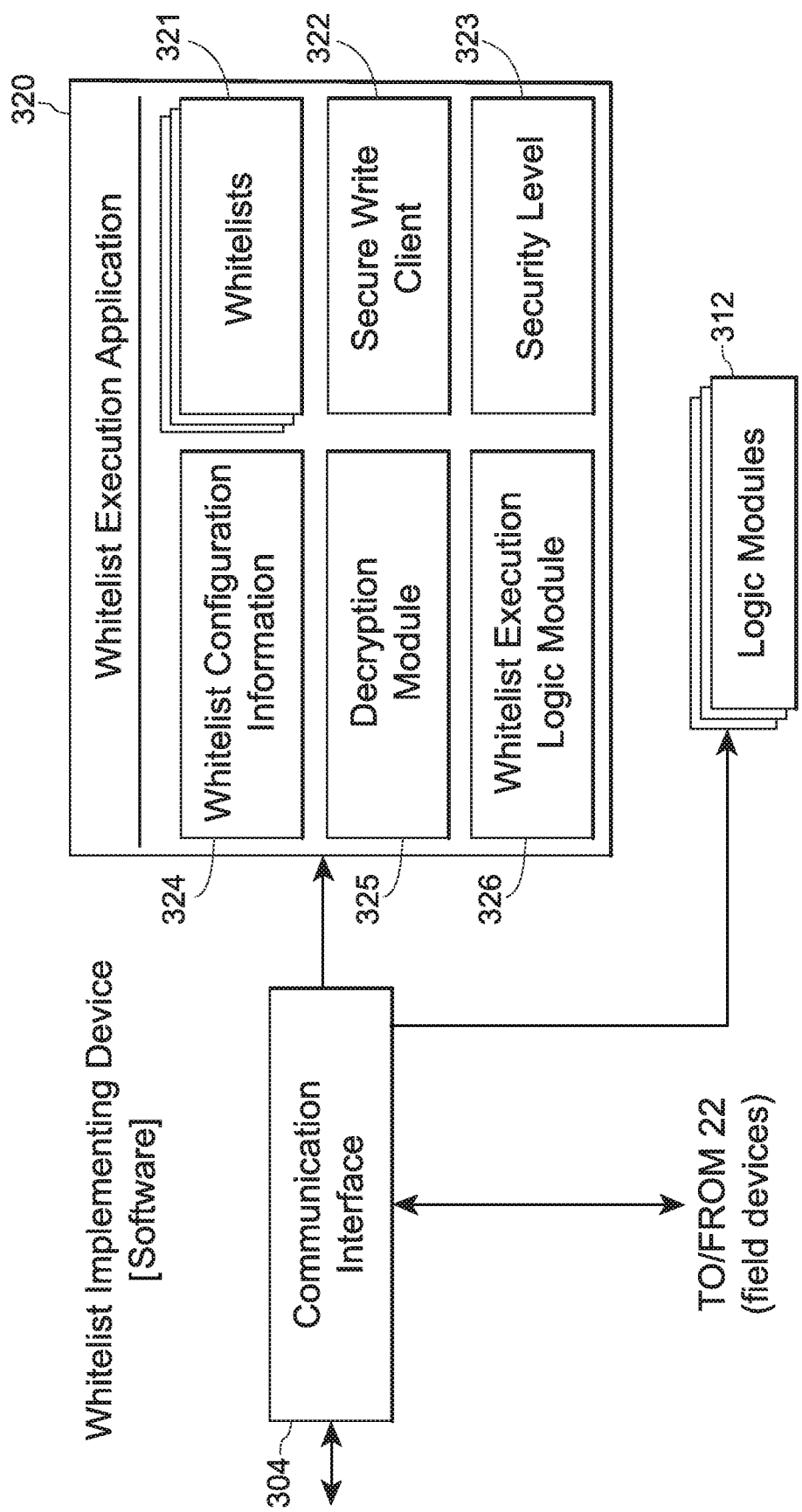
FIG. 3B is a block diagram of an example whitelist execution application operating within an example safety logic solver schematically illustrated in FIG. 3A.

FIG. 3B illustrates at least a portion of the device 300 of FIG. 3A in more detail, including an expanded view of the whitelist execution application 320 running on the processor 301 of the device 300. The expanded view of the whitelist execution application 320 includes a whitelist execution logic module 326, a decryption module 325, whitelist configuration information 324, and a set of one or more whitelists 321, a secure write client 322 and a security level setting 323. The secure write client 322 may enable authentication of users who intend to add to, delete from and generally edit the whitelist configuration information 324 and whitelists 321 of the whitelist execution application 320. Some of the whitelist configuration information 324 may be sent to the whitelist execution application 320 in an encrypted form. Encrypted whitelist configuration information may be decrypted by the decryption module 325. Moreover, the whitelist execution logic module 326 includes logic or programming that, when executed on the processor 301 of FIG. 3A, receives messages or commands from the communication interface 304 (sent by a process controller, a user interface, or any other device and intended for the device 300 or a device in a subnetwork connected to the device 300) and, in coordination with the other components of the whitelist execution application 300 determines whether to allow the messages commands to be processed further by the device 300 (e.g., in the logic modules 312) or to be sent to one or more devices (e.g., the field devices 22) in a subnetwork connected to the device 300.

The whitelist execution logic module 326 will determine if a message received via the communication interface 304 is to be allowed or not (e.g., processed by the device 300 or sent to a device in the subnetwork to which the device 300 serves as a gateway) is based in part on the whitelist configuration information 324, the whitelists 321 and the security level 323. The security level 323 stores the security level of the whitelist implementing device 300 at a moment in time. The security level 323 may be set using a hardware key 303 of FIG. 3A, or it may be set via an appropriate user of one or more of the user workstations 16 of FIG. 1, or via any other desired method. The whitelists 321 constitute a list of whitelists. Each whitelist is an exclusive set of allowable command types. As will be understood, at least one of the plurality of whitelists 321 may contain device specific and/or common practice commands, specifically device specific and/or common practice read commands. The whitelist configuration information 324 contains data that is used to determine which whitelist 321 may be used for a given incoming command or process state or other information that may affect which whitelist 321 is to be used. Specifically, the whitelist configuration information 324 may constitute a map, such as a Hash Map, which defines which whitelist(s) are to be used when the illustrated device is set to a specific security level. The whitelists 321 and the whitelist configuration information 324 may be stored in lists, maps, hash maps, hash sets, linked lists, queues, stacks and/or any other applicable data structure. The manner in which the whitelists 321 are selected and in which the incoming messages are allowed or not is determined by the operation of the whitelist execution logic module 326, as illustrated in more detail by a flow diagram 400 in FIG. 4.

Figure 4:
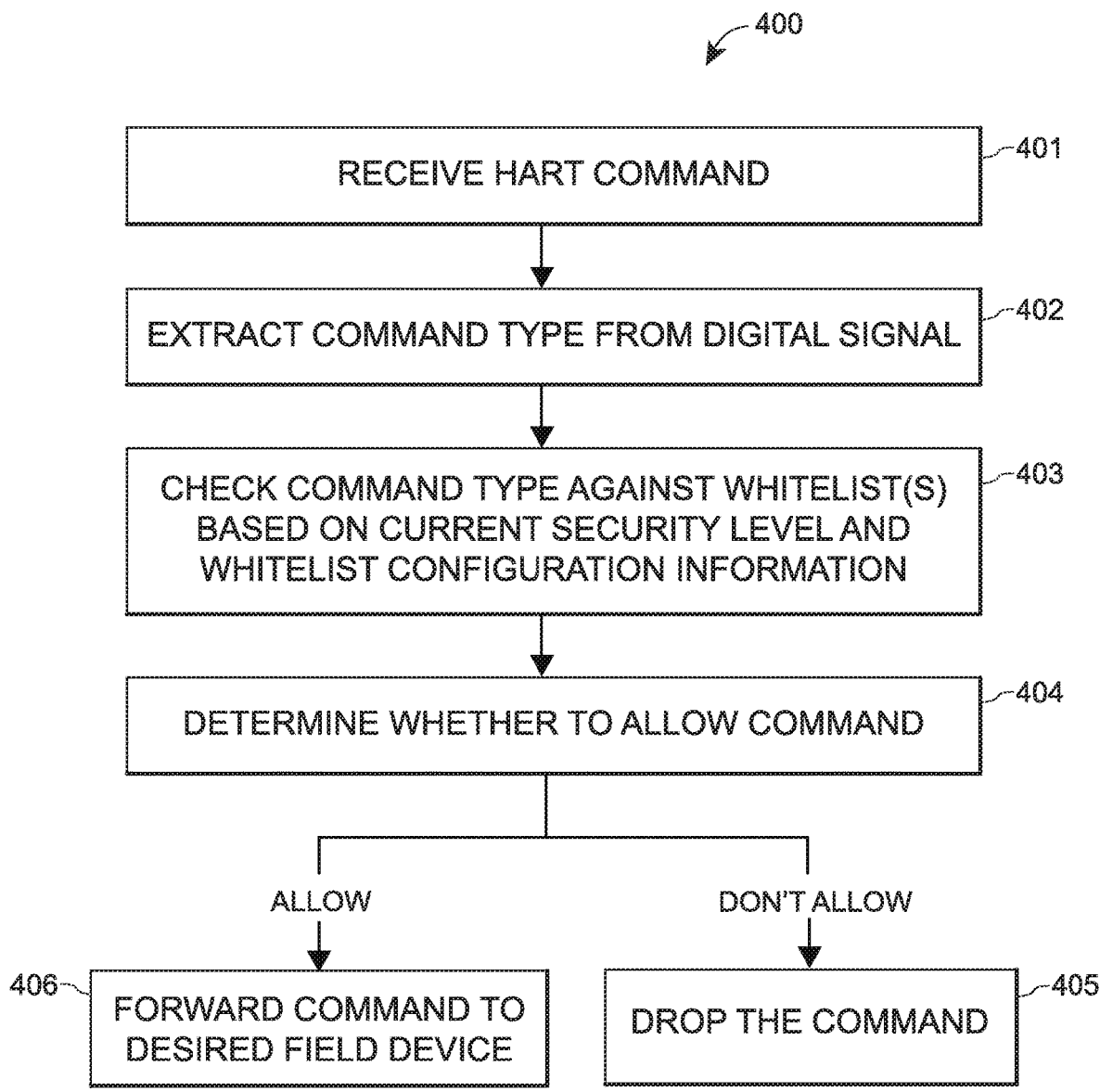
FIG. 4 illustrates a block diagram of an operation of a whitelist execution application.

In particular, as illustrated in FIG. 4, at a step 401, the whitelist execution logic module 326 of FIG. 3B receives a command or message (e.g., a HART message) from the communication interface 304. Then, at a step 402, the application 320 identifies the command type by extracting the command type field from the message. At a step 403, the application 320 retrieves one or more whitelist(s) 321 based on the current security level 323 and the whitelist configuration information 324 as detailed below. At a step 404, if the command type of the received message is present in the whitelist(s) 321, the application 320 enables the message to be processed as an allowed message. At a step 406, the application 320 may enable the communication interface 304 to forward the message to the desired field device over a communication interface 304 or to be processed by one or more of the logic modules 312 within the device 300, as explained in more detail below. At a step 404, if the message type is not contained in the whitelist 321, the application 320 may mark the message so that it is not processed as it is a non-allowed message. At a step 405, the non-allowed message may be dropped (e.g., it may not be returned to the communication interface for forwarding) or it may be dropped in any other manner. The step 405 may further or alternatively include notifying plant personnel, such as process control operators, maintenance personnel, configuration engineers, etc., via the communication interface 304 that the message has been dropped so that these persons or the originating device may take appropriate actions.

Thus, when an incoming message (e.g., a HART message) is received by the communication interface 304, it is first passed to the whitelist execution application 320. The whitelist execution logic module 326 of the whitelist execution application 320 includes communication logic which extracts the command type from the message and looks up a whitelist 321 using the whitelist configuration information 324 and the security level 323. The whitelist execution logic module 326 may then search for the extracted command type in the selected whitelist to determine if the message should be allowed or denied. For example, if a hardware key 303 on the device 300 hosting the whitelist execution application 320 is set to a position indicating a high level of security, the whitelist configuration information 324 may specify that incoming commands through the communication interface 304 may be checked against a first whitelist. When the whitelist implementing device 300 is set to a medium level of security however, the whitelist configuration information 324 may specify that incoming commands may be checked against a second whitelist. The second whitelist may be longer (i.e. less strict). Alternatively or additionally, the whitelist configuration information 324 may specify that at a low security level(s), the whitelist execution application 320 may use a total whitelist (i.e. include every command type). Alternatively or additionally, the whitelist configuration information 324 may specify that at an even higher security level, the whitelist execution application 320 may use an empty whitelist (i.e. a total blacklist). Of course, each whitelist may contain any number or types of command types that are allowed and these may be different, not overlapping sets, in many instances.

Of course, if a message is allowed, at the step 406, the message may be returned to the communication interface 304 for standard operation. Standard operation may include the execution of one or more logic modules 312. The standard operation may further and/or alternatively include forwarding of the message or processing the message based on standard protocols, such as for example, using a MAC address or IP address destination field of the message, alternatively or additionally using pass-through HART communication.

In another embodiment, or the same embodiment, the whitelist configuration information 324 may define which whitelists are to be used when the whitelist implementing device 300 is set to a specific security level and the incoming command destination is a specific field device connected to the whitelist implementing device 300. As such, the step 402 may both extract a command type and a destination from the signal to determine which whitelist to use and if the message is allowed based on that whitelist. For example, if a hardware key 303 on the whitelist implementing device 300 is set to a position indicating a high level of security, the whitelist configuration information 324 may specify that incoming commands through the communication interface 304 destined for a first valve are to be checked against a first whitelist. When the incoming commands are destined for a second valve at the same security level, however, the whitelist configuration information 324 may specify that incoming commands are to be checked against a second whitelist. Of course, this is but an example, and many other combinations of configuration, process state, or other data may be used to determine which whitelist to use in processing any particular message at any particular time.

Figure 5A:
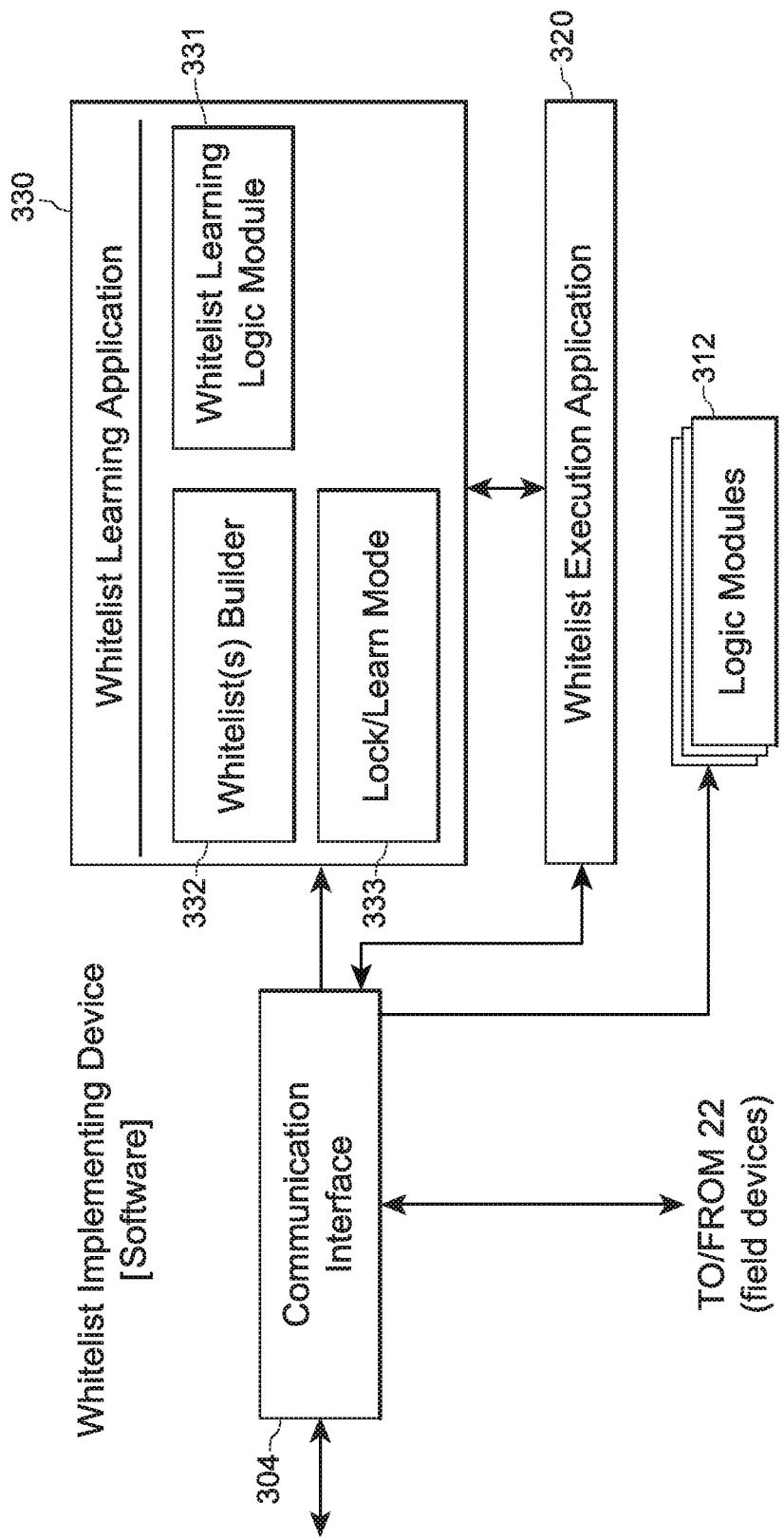
FIG. 5A is a block diagram of an example whitelist learning application.

FIG. 5A illustrates a least a portion of the device 300 of FIG. 3A in more detail, including an expanded view of the whitelist learning application 330 running on the processor 301 of device 300. The expanded view of the whitelist learning application 330 includes a lock/learn mode setting or data 333, a set of whitelist(s) builder logic data 332, and a whitelist learning logic module 331. The whitelist learning logic module 331 may contain machine executable code that when executed, performs the logic of the whitelist learning application 330. The lock/learn mode 333 may indicate or store data indicating that the device 300 is in a "lock" state or that the device 300 is in a "learn" state. The device 300 may switch from a lock mode to a learn mode and vice versa according to either a hardware element on the device, such as a key, or according to commands issued through one or more of the workstations 16 of FIG. 1, by appropriate users such as configuration engineers, plant operators, maintenance personnel etc. The actions taken by the whitelist learning logic module 331 may depend on these states. The whitelist(s) builder logic or data 332 is used to build whitelist configurations when the device 300 is in a learn state, as will be understood. The whitelist(s) builder logic or data 332, similar to the whitelist configuration information 324 of FIG. 3B, may constitute a map, such as a Hash Map. Generally speaking, the whitelist learning application 330 may receive commands from a communication interface 304 and the application 330 may forward these commands to the whitelist execution application 320, and/or return messages to communication interface 304 for forwarding to desired destination field devices based on the settings and operation of the logic module 331.

Figure 5B:
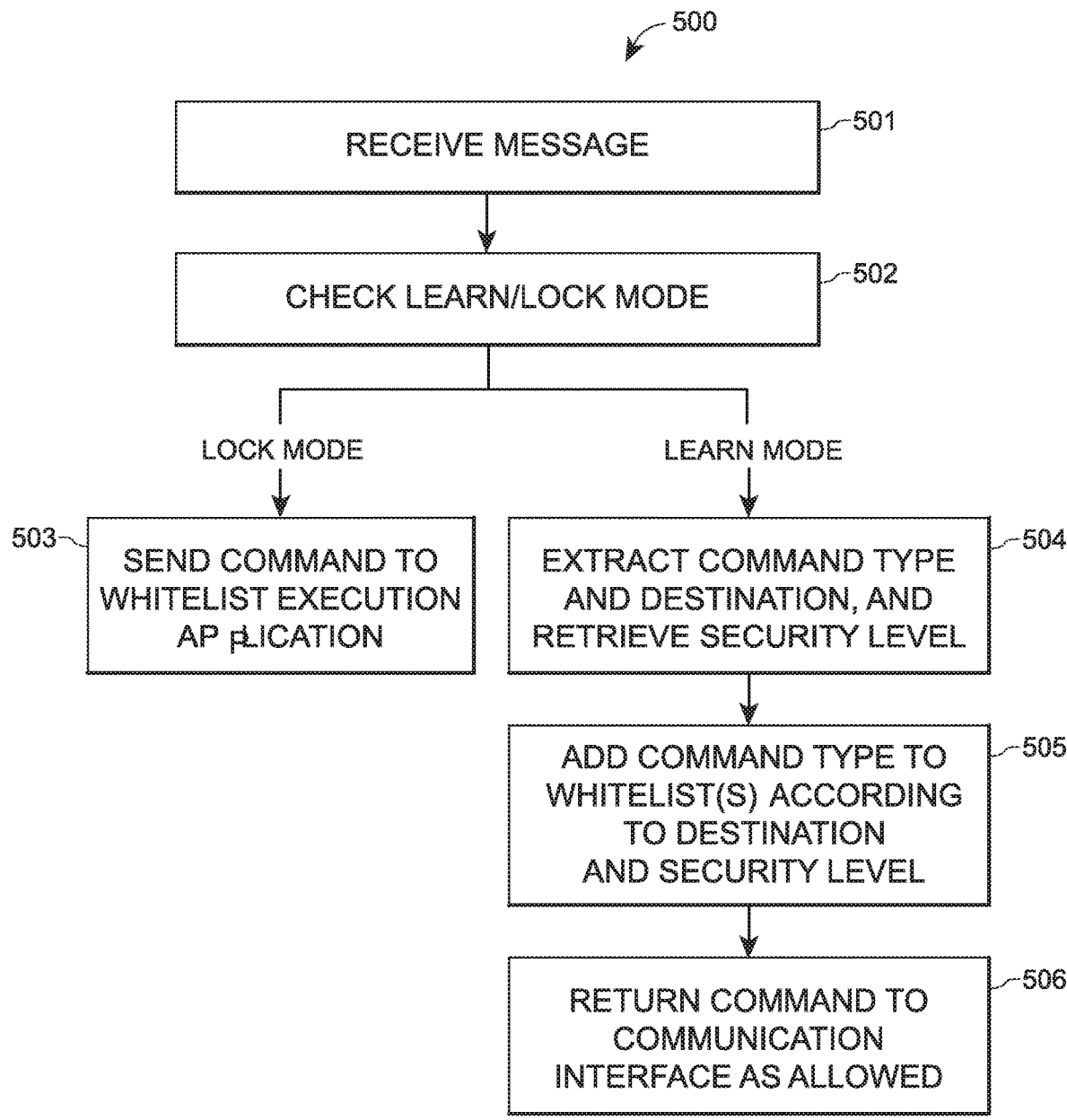
FIG. 5B illustrates a block diagram of an operational flow of a whitelist learning application flow.

FIG. 5B illustrates one example of the flow diagram 500 of the whitelist learning logic module 331 in more detail. When the whitelist learning application 330 receives a message from the communication interface 304 (at a step 501), the logic module 331 may first check to determine if the device 300 is in a "learn" state or if instead, the device 300 is in a "lock" state as defined by the data 333 (at a step 502). If the device 300 is in a lock state, the application 330 may simply send the message to the whitelist execution application 320 to be processed as described above (at a step 503). If the device 300 is in a learn state however, the logic module 331 may treat incoming messages as being of a safe nature and will use the whitelist(s) builder logic 332 to appropriately "learn" information about the message, such as the HART command type of the message, the devices in the subnetwork that receive messages, etc. After the logic 332 "learns" this information, the whitelist learning logic module 331 passes the command back to the communication interface 304 to perform standard operation, such as, for example, executing logic modules 312 and forwarding the command to its desired destination. Thus, as illustrated at a step 504, when in a learn mode, the whitelist learning logic module 331 may extract the command type (and security level and any other desired information) of the incoming message. Then, at a step 505, the logic module 331 may use the whitelist(s) builder 332 to build a whitelist and a whitelist mapping, as will be understood, to store the command type. For example, in one embodiment, at the step 504, the whitelist learning logic module 331 may check the security level 323 of the device 300, and may further look up the security level in the whitelist(s) builder to check if there is an existing whitelist already for that security level. In the case that there is an existing whitelist, the logic module 331, at the step 505, may append the command type to that whitelist in the whitelist builder logic or data 332. In the case that there is not an existing whitelist, the logic module 331 may store a new whitelist corresponding to that security level, wherein the whitelist contains the command type of the incoming message. In another embodiment, the whitelist builder 332 may further store mappings from a combination of security level(s) and command destination(s) (and/or other information) to whitelist(s). For example, in one embodiment, the whitelist learning logic module 332 may check the security level 323 of the security gateway device 300, and the device destination (e.g., device address) of the incoming message. Then, the logic module 331 may look up, in the whitelist builder data 332, a value corresponding to that security level and that device destination to see if a whitelist exists for that combination. If a whitelist exists, the logic module 331 may append the command type to the whitelist and if the whitelist does not, then the logic module 331 may create a new whitelist containing that command type for that destination device. The whitelist learning application 330 may communicate with the whitelist execution application 320 at various points during execution of the learning application 330. Specifically, the learning application 320 may directly edit the whitelist configuration information 324 of FIG. 3B as it receives new commands, instead of or in addition to using the whitelist(s) builder logic or data 332. Of course, when building whitelists during a learn mode, as illustrated at the step 506, the logic module 311 may return the message or command to the communication interface as being allowed for normal processing.

Finally, when the whitelist learning application 330 recognizes that the device has switched or is switching from a learn state to a lock state, the application 330 (or the logic module 331 thereof) may update the whitelist execution application 320 as appropriate, including updating one or more whitelists used by the application 320. If the application 330 has stored its learned information in the whitelist(s) builder 332, the application 320 may then empty the whitelist(s) builder 332. It may also configure the whitelist execution application 320 based on updated whitelists which reflect the information contained in the whitelist(s) builder 332 before being emptied. For example, when the device 300 is switched from a learn state to a lock state, the application 323 may append all of the commands from the whitelists it has built (as reflected in the builder logic or data 332) to the appropriate whitelists in the whitelist configuration information 324 of the whitelist execution application 330. Alternatively, the application 330 may replace the whitelists stored in and used by the whitelist execution application 320 with the whitelists created in or by the builder logic or data 332 during the learn mode. As will be understood, the whitelist learning application 330 enables the automatic learning of or building of whitelists for use by the whitelist execution application 320 based on a known normal operation of the process control and safety system.

Figure 6:
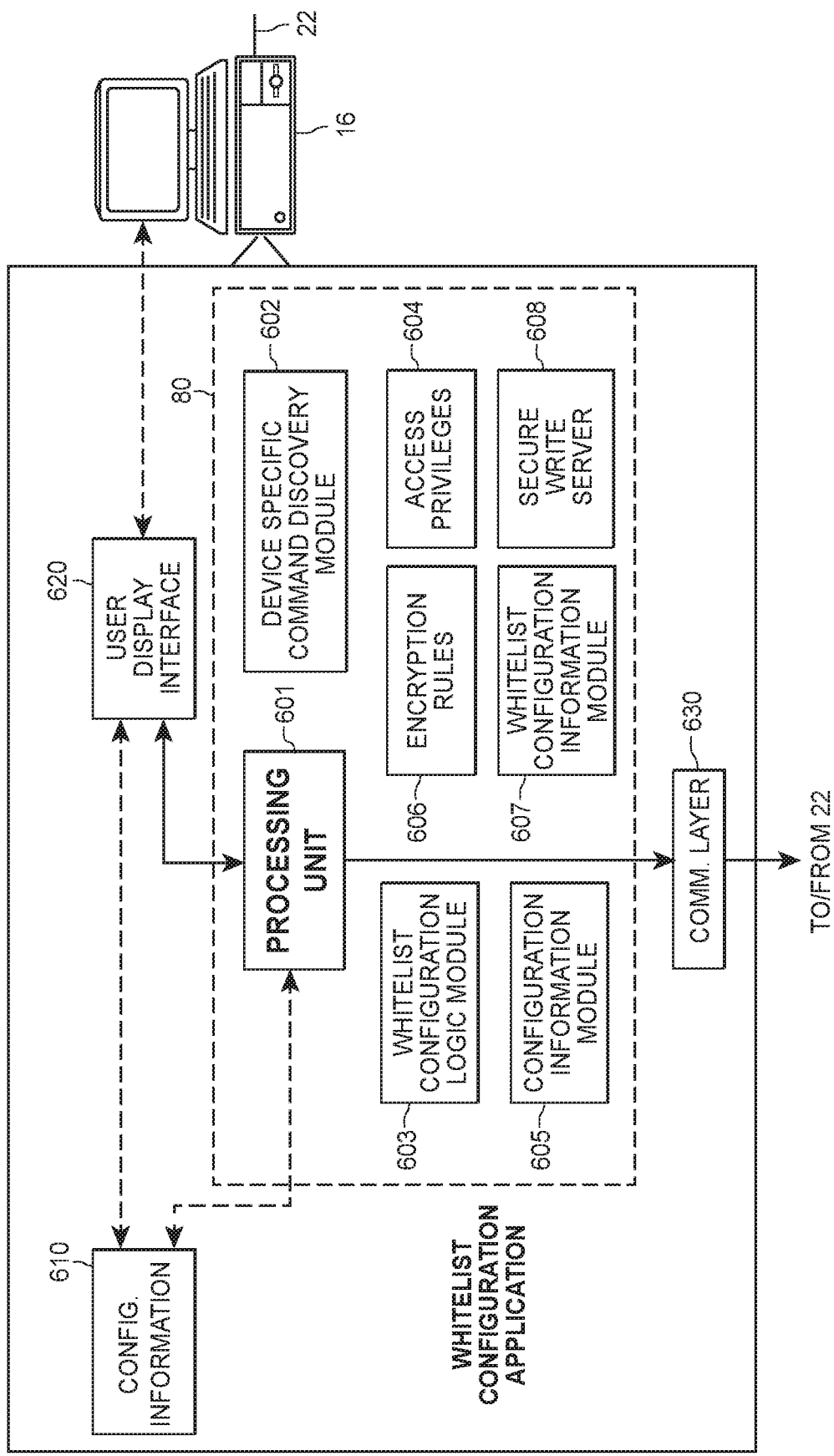
FIG. 6 is a block diagram of an example whitelist configuration application system having a whitelist configuration application disposed within one or more of the workstations of FIG. 1 that manages, creates and edits whitelist configurations.

The operation of the whitelist configuration application 80 of FIG. 1 will be described in more detail with reference to FIGS. 6-9. In particular, FIG. 6 illustrates the secure whitelist configuration application 80 disposed in one of the workstations 16 of FIG. 1, wherein the whitelist configuration application 80 may be executed to perform whitelist configuration actions such as creating and establishing one or more whitelists for use in one or more of the security gateway devices in the process plant, such as in one or more of the process controllers 24, 26 or safety logic solvers 50, 52, 54, 56 of FIG. 1, downloading the whitelists to the security gateway devices, configuring the security gateway devices to include whitelisting functionality, changing security settings of security gateway devices, etc. Generally speaking, the whitelist configuration application 80 is configured to execute a whitelist configuration logic module on a processing unit 601, and is communicatively coupled with a configuration memory 610 that includes configuration information, with a communication layer 630 that communicates with other devices in the process plant 10 and with a user display interface 620 which interacts with a user interface to provide information to and to obtain information from one or more uses.

More particularly, the secure whitelist configuration application 80 interacts with communication software, such as a communication layer or stack 630, that communicates with the process controllers 24 and 26 via the Ethernet connection 22 to send signals to and receive signals from the controllers 24 and 26, the safety logic modules 50-56, the I/O devices 28-36, the field devices 40, 42, 60 and 62 and/or other workstations 16. The communication layer 630 also properly formats messages to be sent to the controllers, I/O devices, field devices, safety logic solvers and other workstations such as alarm acknowledgment signals. The communication software 630 can be any known or desired communication software which is currently used with, for example, Ethernet communications. Of course, the communication stack 630 may be coupled to other software which performs other functions, such as configuration applications, diagnostic or other process applications, database management applications, etc. which run within the workstation 16.

The configuration memory 610 may store or provide configuration information that represents the physical and electrical configurations, connections, and links within the process plant 10, and may define the communication abilities between devices within the process plant 10. The configuration information of FIG. 6 may be the configuration information database 21 of FIG. 1 or may store plant configuration information locally or may retrieve the configuration information from another location. The user display interface 620, within the workstation 16, may enable the whitelist configuration application 80 to read user inputs, to provide information to the user, or to perform any other user interface activities. In general, the processing unit 601 may operate in conjunction with the user display interface 620 to detect requests for reads from or writes to elements within the process control system 12 and the safety system 14. Together, the configuration information memory 610, the user display 620 and the communication layer 630 operate to enable the functionality of the whitelist configuration application 80.

Generally speaking, the whitelist configuration application 80 executes on the processing unit 601 to perform secure whitelist configuration procedures with respect to any desired whitelist configurations destined for a process controller(s) 24 and/or 26 of the process control system 12 or a safety logic solver(s) 50-56 of the safety system 14 or any other security gateway device within the plant 10. The whitelist configuration application 80 is configured to authenticate users, to create one or more whitelists, to receive instructions from users to edit a whitelist or to change the configuration of a whitelist execution application 320 through read and write functionality, and to configure the desired security gateway devices and their corresponding whitelist execution applications 320. As illustrated in FIG. 6, the whitelist configuration application 80 includes a device specific command discovery module 602, a whitelist configuration logic module 603, a set of stored access privileges 604, a configuration information module 605, a set of encryption rules 606, a whitelist configuration information module 607, and a secure write server 608. While the secure whitelist configuration application 80 is illustrated as a stand-alone application, it will be understood that this application may be incorporated into any other applications used in the operator workstations 16 (or any other computers) of FIG. 1 to assure that reads from and writes to the safety system 14 (and, if desired, the process control system 12) are made according to a secure whitelist configuration application 80.

Generally, the whitelist configuration logic module 603 executes on the processing unit 601 to perform the logic associated with the application 80 and, more particularly, operates to use the other modules (which may be subroutines) or information components 602 and 604-608, in conjunction with the communication layer 630, the configuration information 610 and the user display interface 620 to perform configuration of the whitelist execution applications 320 and the whitelist learning applications 330. These configuration activities may include creating and setting up (downloading) one or more whitelist execution applications 320 and/or whitelist learning applications 330 in one or more security gateway devices in the plant 10, enabling or changing the configuration settings of one or more whitelist execution applications 320 and/or whitelist learning applications 330 in the plant 10, and creating or modifying one or more whitelists used by one or more whitelist execution applications 320 in the plant 10.

Generally speaking, the logic module 603 performs user authentication using the secure write server 608 and the set of stored access privileges 604 which define which authenticated user accounts may configure the whitelist execution applications of particular logic solvers, process controllers or other security gateway devices. Still further, the logic module 603 may call the device specific command discovery module 602 to discover one or more commands that are to be placed in one or more whitelists to be used in one or more of the whitelist execution applications 320. Likewise, the logic module 603 may use the configuration information module 605 to store or to obtain general configuration information about the plant 10 and the devices within the plant to create one or more whitelists, and may use the whitelist configuration information module 607 to store or obtain configuration information pertaining to one or more whitelists which have been created for use in the plant 10. Likewise, the logic module 603 may use the encryption rules 606 to perform encryption of information to be sent to and received from devices within the plant 10.

During operation, the application 80 may receive information from the user display interface 620 pertaining to a requested whitelist configuration read or write activity. In response, the logic module 603 (which executes on the processing unit 601) determines whether the requested whitelist configuration read or write pertains to a process controller or to a safety logic solver (or other security gateway device) to which the authenticated user has the appropriate access privileges 604 (i.e., for which the user is able to issue configuration reads and/or writes). As part of this process, the whitelist configuration logic module 603 may receive data from the user display interface 620 and authenticate a user via the secure write server 608. In some cases, the logic module 603 may already know the identity of the user and indicate ahead of time the write/read abilities of the user by graying out sections of the user interface display screen referring to devices to which the user cannot read and/or write. In other cases, the logic module 603 may alternatively or additionally request the user to provide a password and user identification and the logic module 603 may check these against the stored user access privileges 604 for proper authority before performing the requested read and/or write.

After receiving commands from authenticated users from the user display interface 620 to configure a particular security gateway device within the plant 10 (e.g., to download a whitelist execution application, to change a setting of the whitelist execution application or learning application such as to put the device in a learn or a lock mode, to add, change or delete a whitelist, etc.), the whitelist configuration logic module 603 uses the whitelist configuration information module 607, the configuration information module 605 and the device specific command discovery module 602 to prepare configuration commands, and to send these commands to appropriate process controllers and/or safety logic solvers to configure one or more whitelist execution applications 320 or whitelists within these devices. These outgoing commands may download or may update whitelist execution and learning applications 320 and 330 on the process controllers and/or safety logic solvers to change settings of these applications to download or install these applications, to change whitelists used by these applications, etc. Moreover, the logic module 603 may use the whitelist configuration information module 607 to provide users with information on existing whitelist configurations in the process plant 10. The whitelist configuration information module 607 may, for example, store representations of the whitelist configurations locally on the device 16 of FIG. 6, or the module 607 may use the communication layer 630 to retrieve the whitelist configuration information, such as from the safety logic devices 50-56 and/or process controllers 24 or 26 or a configuration database (such as the database 21 of FIG. 1. Moreover, the configuration information module 605 may retrieve other configuration information implemented by the configuration application 80, illustrated in part in FIG. 2, and stored in the configuration database 21 of FIG. 1 via the network 22 when the logic module 603 needs this information.

In one embodiment, the whitelist configuration application 80 configures whitelists on the logic solvers 50-56 or the process controllers 24 or 26 by enabling users to issue specific instructions to add or remove specific command types to new or existing whitelists. The configuration application 80 also enables users to edit existing whitelists in the same manner. Editing functionality may be provided by the retrieval of information from the whitelist configuration information module 607 and providing this information to the user via the user interface, and then enabling the user to specify changes to the whitelists. For example, the whitelist configuration application 80 may receive indications from users to configure specific device(s) with certain whitelist configurations. The devices that can be changed may be restricted to a certain subset of the devices within the plant 10 according to the access privileges 604. As will be understood, the whitelist configuration application 80 may also obtain configuration information from the user that specifies which whitelist(s) correspond to (or are to be used for) which security level(s) of the specific device(s). The application 80 then configures the indicated device(s) 300 according to the new whitelist configuration information by sending out packets according to communication protocols such as HART or any other communication method known to one skilled in the art to the devices in which the whitelists reside or are used.

In another embodiment, the whitelist configuration application 80 receives an indication of a safety logic solver 50-56, process controller 24 of 26 and/or field device and utilizes a device specific command discovery module 602 to retrieve relevant device specific and common practice command types for one or more field device(s) as suggestions for the user to use in the whitelists for the device. The device specific HART commands discovered by the device specific command discovery module 602 may be presented to the user of the whitelist configuration application 80 via the user interface 620 as suggested options for building new whitelists or for editing existing whitelists. The suggested options may correspond to the user selected field devices and may additionally or alternatively correspond to the field devices connected to the user selected safety logic solver(s) 50-56 or process controller(s) 24 or 26.

In yet another embodiment, the process plant personnel may use the whitelist configuration application 80 to automatically perform any number of the aforementioned steps. The process plant operators or configuration engineers may configure the whitelist configuration application 80 to automatically perform the aforementioned discovery process. The whitelist configuration application 80 may further automatically build the aforementioned whitelists of the device specific commands using the discovery module 602. The whitelist configuration application 80 may additionally or alternatively build the aforementioned whitelists using only the read commands as detailed above. Additionally, the whitelist configuration application 80 may automatically configure the whitelist execution application of specific safety logic solvers 50-56 or process controllers 24 or 26 to implement the automatically generated whitelists. These automated steps may be part of the aforementioned manual process, or may be automated to any degree one skilled in the art may desire. Each automated step may be performed in response to a command from a user or it may be performed in response to a change in the process plant. For example, whitelist generation may be automatically engaged after a field device 40, 42, 60 or 62 is installed in the process plant, or it may be directed to find recently installed field devices 40, 42, 60 or 62 by a user. In another example, the user may select a specific device 50-56, 24, 26 40, 42, 60 or 62 in the process plant and then commence an automatic whitelist generation and configuration process.

In all of the foregoing embodiments, the configuration information sent across the communication layer 630 to configure the whitelist implementing devices 300 may be encrypted using encryption rules 606, based on information from the user display interface 620.

In a preferred embodiment, the whitelists are composed generally of read commands, such that write commands, which have more potential to be of a dangerous nature, are excluded. Further, instead of building whitelists composed solely of read commands of the HART universal type, in one embodiment, whitelists further include read commands of the HART device specific type, or of the HART common practice type.

Figure 7:
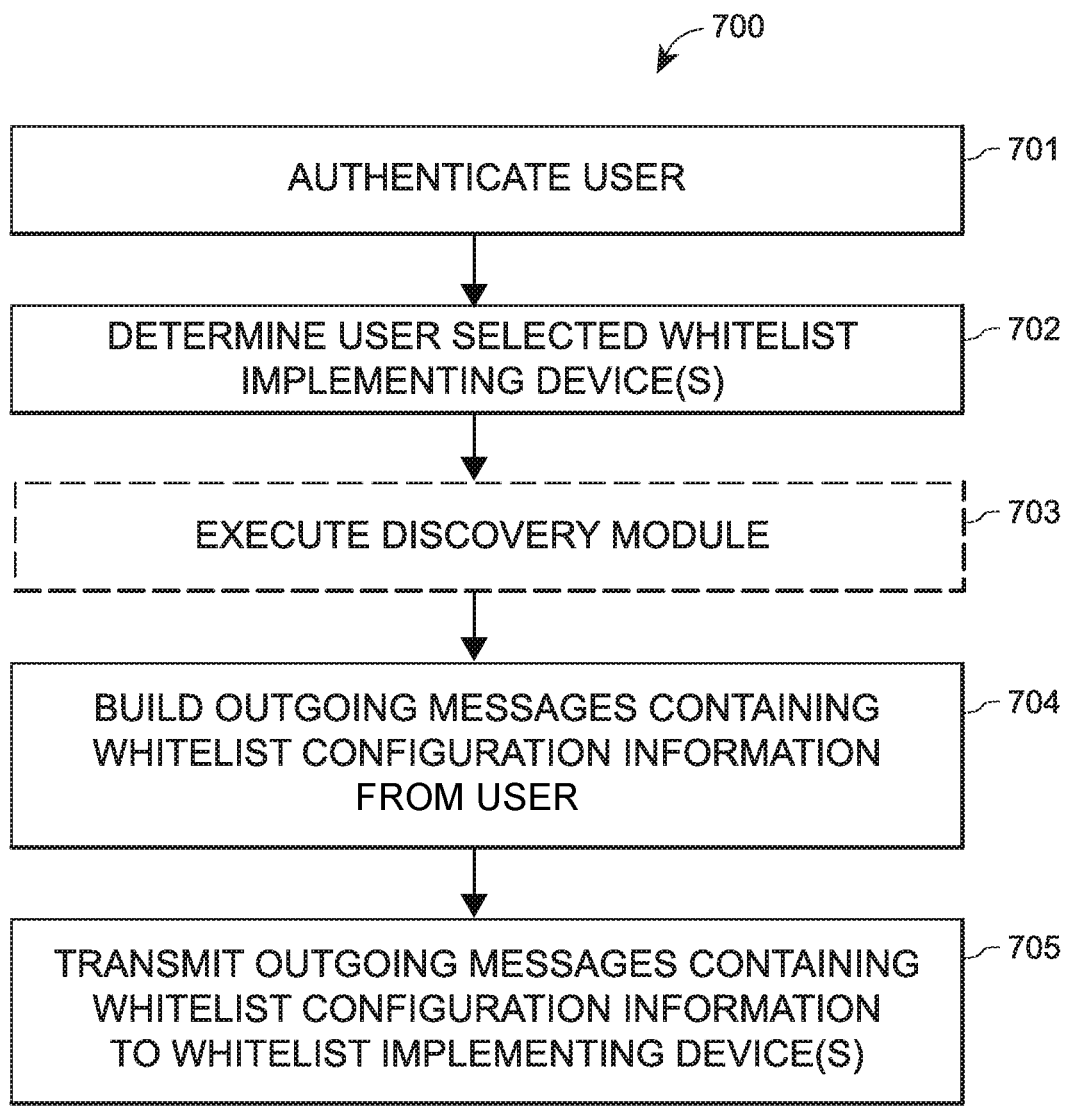
FIG. 7 illustrates a block diagram of an operational flow of a whitelist configuration application.

FIG. 7 illustrates a flowchart 700 of an example of the logic of the whitelist configuration logic module 603 of the whitelist configuration application 80 of FIG. 6. In a step 701, the logic 603 authenticates a user via a login process. Then, the logic 603 presents a user with a user interface through a user display interface of one of the workstations 16 of FIG. 6. In a step 702, the logic 603 enables the user to identify a whitelist implementing device 300 to be configured. In one embodiment, determining the user selected whitelist implementing device 300 may require additional steps if the received information specifies specific field devices and/or field device type(s) 40, 42, 60 and/or 62. The additional steps may constitute using the configuration information module 605 of FIG. 6 to retrieve the identity of the safety logic solvers 50-56 and/or process controllers 24 or 26 (or other security gateway device) which are coupled to or which serve as gateways to the specified field devices and/or field device types. Next, in a step 703, the whitelist configuration logic module 603 executes the device specific command discovery module 602, as described in more detail below, to determine or discover a set of device commands that can be used in a whitelist for the specified device. The step 703 may also include building one or more whitelists for the device based on the discovered command information for the device and the logic module 603 may build these whitelists automatically, or based on user input. Generally, however, the logic module 603 may provide the user with a set of suggested commands to put into one or more whitelists for the device and enable a user to modify or confirm those suggestions. In steps 704 and 705, the whitelist configuration logic module 603 then constructs configuration messages (e.g., messages including the whitelists to use or changes to the setting of the whitelist execution and learning applications 320 330) and transmits the configuration information to one or more whitelist implementing devices 300 (e.g. safety logic solvers 50-56 and/or process controllers 24 or 26) so as to affect the configuration of one or more whitelist execution applications 320 or learning applications 330. Optionally, the whitelist configuration application 80 may only perform the authentication step 701 after the user attempts to transmit the whitelist configuration information. Alternatively or additionally, the whitelist configuration application 80 may only prompt users to authenticate themselves after checking to see if the access privileges 604 allow universal read/write access, to avoid unnecessary authentication. Alternatively or additionally, the whitelist configuration logic module 603 may use encryption rules 606 of FIG. 6 to encrypt outgoing messages before they are transmitted.

Figure 8:
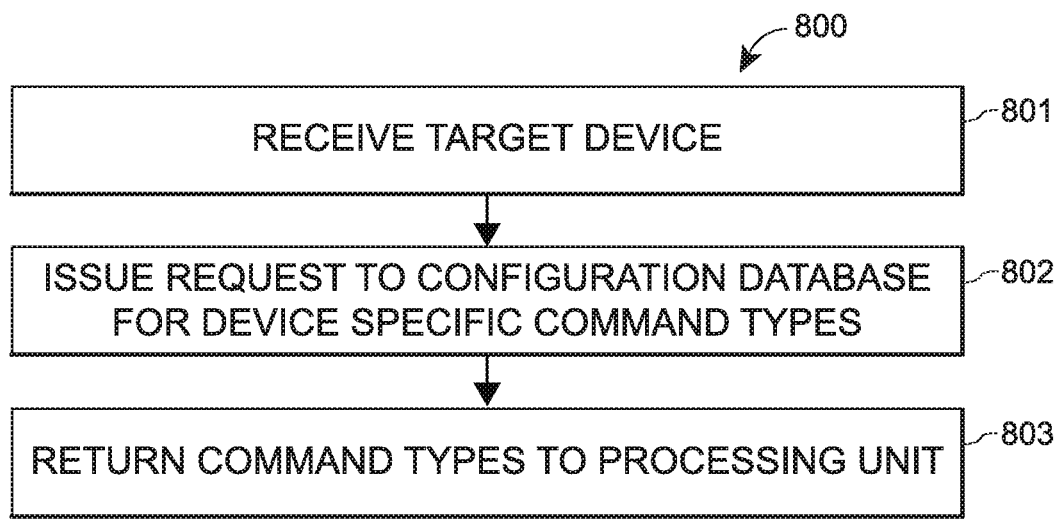
FIG. 8 illustrates a block diagram of an operational flow of a routine that discovers device specific and common practice command types from a device description.

FIG. 8 illustrates a flowchart 800 depicting an example of the operation of the aforementioned device specific command discovery module 602 which is used (in step 703 of FIG. 7 for example) for gathering or discovering device specific and/or common practice command types of a particular field device, to be used in one or more whitelists. In a step 801, the module 602 receives a target device from, for example, the processing unit 601 of FIG. 6. Then, in a step 802, the module 602 queries the configuration database 21 or the configuration information 610 or otherwise uses the configuration information module 605 to retrieve the device specific command types and/or the common practice command types associated with the selected field devices 40, 42, 60 and/or 62. In a step 802, the module 602 may optionally only issue a query for device specific and/or common practice read command types to be received from a user, or from a configuration database where these may be stored. In a step 803, the module 602 transmits the command types to the processing unit to be used in a manner described above and below. In an alternative embodiment, at the step 802, the module 602 issues a read message to the target device or to a configuration database, requesting a device description for the target device, for example, through the communication layer 630 of FIG. 6. Upon receiving the device description from the configuration database, the target device or another source, the device specific command discovery module 602 parses the device description to access or identify the device specific command types and/or the common practice command types implemented by that device as defined by the device description. Additionally, the module 602 may determine if each device command type is a read or a write command. In another embodiment, at the step 803, the device specific command discovery module 602 then returns the command types to the processing unit where they are used in the aforementioned processes of FIG. 7 to create one or more whitelists. The device specific command discovery module 602 may also optionally only return the read command types that it discovers.

As a more detailed example, at the step 802, the device specific command discovery module 602 issues a request to the configuration database 21 of FIG. 1 for the relevant device specific command types of the relevant device. In this embodiment, the device specific command types have already been parsed out of the device description and stored in the configuration database. If desired, the device specific command discovery module 602 may alternatively only request the device specific read commands, which are also parsed and stored in the configuration database 21. In another embodiment, the device specific command discovery module 602 may request a device description for the relevant device (from a configuration database or from the field device itself, for example) and may process this information directly. For example, the device specific command discovery module 602 may request a device description from a configuration database and may then parse the device description and extract all of the device supported commands, including universal, common practice and device specific type HART commands. In this embodiment, the device specific command discovery module 602 may also further parse the commands to discover which device commands (of any type) are read only commands.

Determining the full set of device commands, including the universal, common practice and device specific commands to request, based on the target device may be accomplished by the use of a configuration information module 605 which may retrieve the configuration information implemented by the configuration application 82, illustrated in part in FIG. 2, and stored in the configuration database 21 of FIG. 1 via network 22. The configuration information may alternatively or additionally be stored locally in device 16 hosting the configuration information module 605. For example, a user of the whitelist configuration application 80 may intend to build a new whitelist for a process controller. The system may enable the user to select CTLR1 from FIG. 2 as an option in user display interface 620. The device specific command discovery module 602 may then determine based on the configuration information module 605 that CTLR1 controls C01-C04, C06-C09 for example. The configuration information module 605 may then, in one embodiment, issue the aforementioned request to the configuration database 21 of FIG. 1 to retrieve the device specific command types of each of the field devices connected to these cards and present them to the processing unit. In another embodiment, the device specific command discovery module 602 may issue a read command to read the device description of field devices that are connected to the I/O cards C01-C04 and C06-C09 directly. The module 602 may then parse these device descriptions and compile the list of command types supported by these devices, including the various different universal, common practice and device specific command types of each of these field devices and present these command types to the processing unit. The application 80 may then suggest these command types to the user as suggested whitelist additions. The application 80 may alternatively only present the device supported read commands or creating or adding to one or more whitelists. The determination that a command type is a read command type may be made already during configuration of the field device. As such, read commands may be retrieved by querying the configuration database 21 for only device read commands. (It should be noted that the phrases device commands and device command types are used interchangeably in this description.) In another embodiment, the application 80 may parse the full list of device commands to determine which commands are read commands. This may be done, for example, by checking that the "OPERATION" tag of a command is "READ". The device specific command discovery module 602 may additionally or alternatively use any caching method known to those skilled in the art to store portions of the configuration database information locally. The device specific command discovery module 602 may operate in conjunction with, in coordination with, or alongside a device install utility.

Figure 9A:
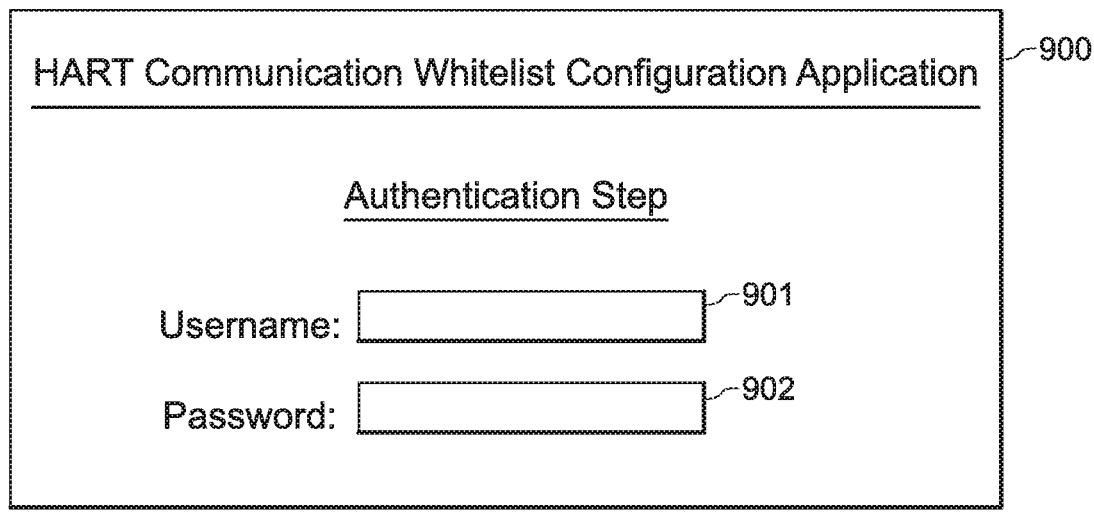
FIG. 9A is an example screen display generated by the whitelist configuration application of FIG. 6 displaying the authentication step of FIG. 7.

FIG. 9A illustrates a simple display screen 900 showing a user interface that enables a user to perform an authentication step of the whitelist configuration application 80 of FIGS. 6 and 7. In this embodiment, the system requires a user to enter a username 901 and a password 902. These credentials may be drawn from other authenticated systems in the process plant 10, or may be specific to the whitelist configuration application 80. The credentials may further be decided by system administrators, operators or experts or by the individual users through another application, as desired.

Figure 9B:
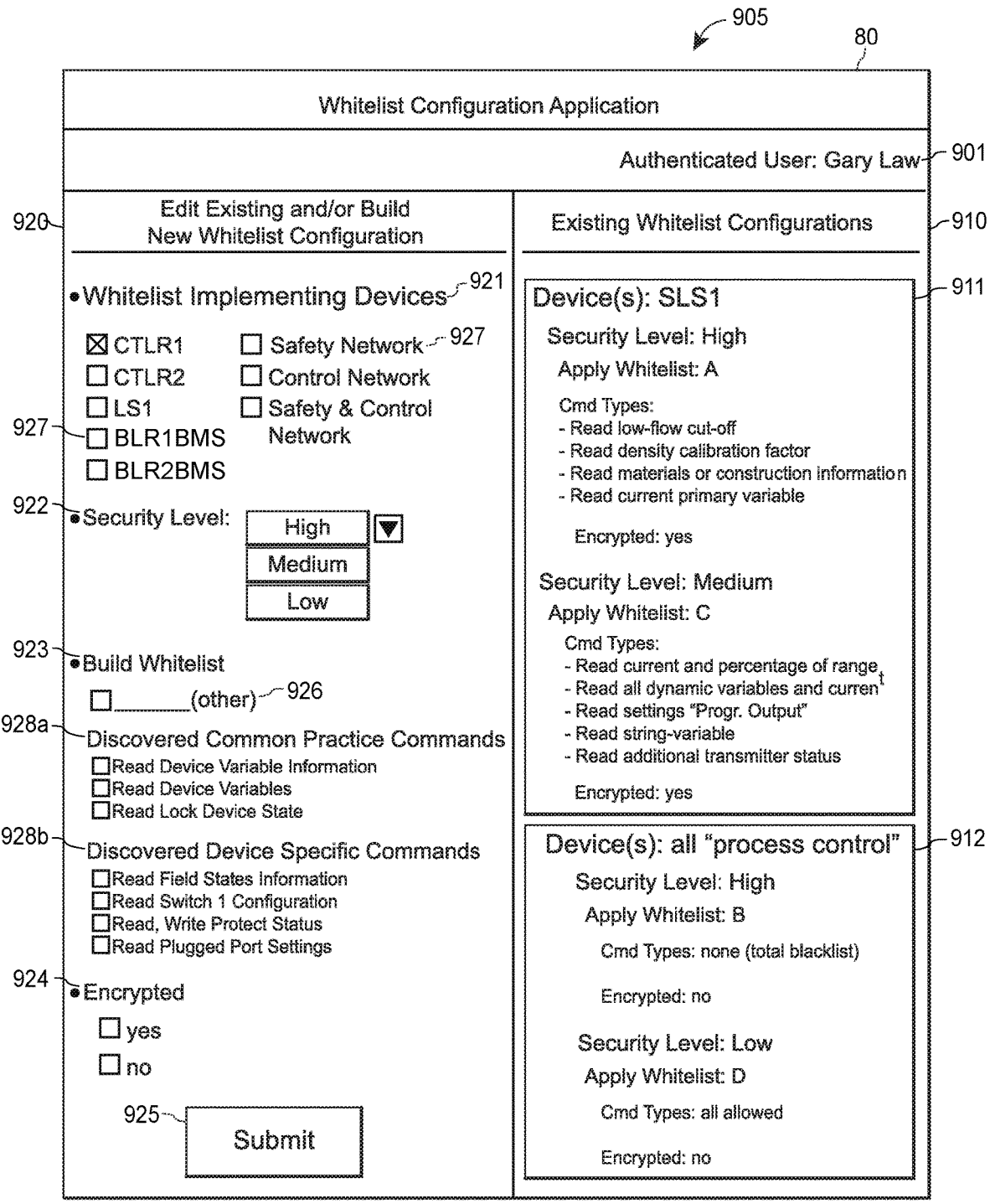
FIG. 9B is an example screen display generated by the whitelist configuration application of FIG. 6 displaying the configuration step of FIG. 7.

FIG. 9B illustrates another display screen 905 showing an example user interface that may be used to enable a user to construct, edit and configure whitelist execution applications 320 for safety logic solvers 50-56 and/or process controllers 24 or 26 in a process plant 10. In particular, the left hand side of the display screen 920 is associated with and may be used to perform editing of existing whitelists or the creation and configuration of new whitelists, while the right hand side of the display screen 910 is associated with displaying existing whitelist configurations 911 and 912. For example, the fields or section 911 illustrates the current configuration of a security gateway device SLS1 as including a Whitelist A for use with the high security level of the device SLS1 and a Whitelist C for use with the medium security setting of the device SLS1. Moreover, the Whitelist A includes four enabled or allowed read commands or command types and specifies encryption, while Whitelist C includes five enabled or allowed read commands or command types and also specifies encryption. Still further, the fields or section 912 illustrate the whitelists that have been configured for all process control devices (e.g., process controllers) at both a high and a low security setting.

Generally speaking a first set of fields 921 on the left hand side of the screen 920 represents or lists whitelist implementing devices 927 that may be configured to include one or more whitelists or whitelist execution applications 80. These devices 927 may include any of the safety logic solvers 50-56 and/or process controllers 24 or 26 or any other security gateway device or node in the plant. A user may select one of the devices 927 to perform configuration on that device or to create one or more whitelists for that device. Authentication procedures already described may result in certain users seeing certain grayed out whitelist implementing devices 927, signifying that the users do not have the access privileges to read and/or write the whitelist configurations of these whitelist implementing devices 927.

A second set of fields 922 represents the security levels of the selected device 927. The user may select one of the various different security levels in the field 922 to configure or create different whitelists for each security setting of a particular selected device 927. A set of commands or inputs in a field 923 may be used by the user to build one or more whitelists for the selected device at the selected security level. The field 923 may allow the user to specify an existing whitelist to use or existing device commands to use to build a new whitelist for the device at an input 926. Additionally or instead, the fields 928 may display a set of discovered device command types (e.g., including more generally, common practice device command types 928a and device specific command types 928b) that have been identified by, for example, operation of the discovery module 602 of FIG. 6. In this case, the user may also or additionally select individual ones of the discovered command types to include in the whitelist by selecting a check box next to the command type.

Thus, as noted above, the configuration application 80 may read values from existing whitelist configurations using the whitelist configuration information module 607 of FIG. 3B and present this information to users when the system acknowledges that a user has selected a particular gateway device 927 (which is connected to or communicates with various specific field devices that use those commands). When a user selects one or more of the process controller(s) or safety logic solver(s) from the left side of the display 920, the security levels and corresponding whitelists that have already been configured are made available to the user for editing. In one embodiment, the whitelists appear as a list of command types that have checked boxes next to them, (i.e. they are pre-selected) and the system enables the user to add new command types to the existing whitelists by selecting or entering new command types. The system further enables users to remove command types from the whitelist by deselecting the pre-selected command types in the left side of the display screen. In another embodiment, the existing whitelist configurations on the right hand panel 910 may provide an edit button to allow for editing using a pop up display screen.

In a similar manner, the application 80 may enable a user to write values to new or existing whitelist configurations using the left side of the display screen 920. In particular, the system may enable a user to select the desired whitelist implementing device(s) 927. These values may specify process controllers or safety logic solvers or other security gateway devices. The application 80 may then enable a user to select a security level 922. Security levels may be of a low, medium and high format, for example or specified in any other manner. Security levels may also be in a binary format such as secured, not secured, or they may be of any other desired format. Then, the user will determine, using the fields 923, the whitelist to be assigned to the selected device(s) at the given security level(s). Depending on the embodiment, the user may be presented with a list 928 of relevant device specific and/or common practice command types to select from, or the application 80 may enable the user to enter command types without being presented with discovered command type suggestions. The application 80 may also enable the user, via a field 924, to elect to encrypt the configuration information such that it securely arrives at the intended destination. Upon specifying the device to be configured (fields 921), the security level of the device to be configured (field 922), the whitelist specifics to be used for the device being configured (field 923) and the encryption status of the whitelist (field 926), the user may select the submit button 925 to cause the application 80 to generate the whitelist being created and to download that whitelist to the intended security gateway device 927 to be used to perform advanced security operations within the process plant 10 using the whitelists and whitelist execution applications described herein.

Of course, while the screen display 905 enables the user to configure single security gateway devices at a time, the user interface associated with the application 80 may enable selection of individual field devices 40, 42, 60 and/or 62 instead or, or in addition to, whitelist implementing device(s). The user interface of the application 80 may further enable selection of field device types instead of, or in addition to individual field devices and/or whitelist implementing device(s) and may enable configuration of a set of security gateways devices (such as all process controllers, all safety system logic solvers in a particular area of a plant, etc.) to be configured with the same configuration information or whitelists.

It is emphasized that the system and method described above may be suitable for situations in which a process contains varied field devices. Using the described method and system, coarse grained blocking of all non-universal non-read commands is not necessary, to the extent that it may be used in combination with blocking of common practice non-read commands and/or device specific non-read commands, to produce a much more fine grained blocking method that allows for the passage of crucial information while also offering appropriate levels of cyber security between workstations, process controllers, safety logic solvers, I/O devices, and their associated field devices.

Generally speaking, any use of the term "safety logic solver" herein may be used interchangeably with process controller, and vice versa, or any other desired process plant device. Further, any use of the term "read command" or "read message" herein may be used interchangeably with "write command" or "write message" or any other suitable HART command categorization, and vice versa. Yet further, any use of the term Device Specific HART commands may be used interchangeably with Common Practice HART commands, and vice versa. Finally, any mention herein of the HART communication protocol may be used interchangeably with another desired communication protocol.

Moreover, the term "field device" is used herein in a broad sense to include a number of devices or combinations of devices (i.e., devices providing multiple functions, such as a transmitter/actuator hybrid), as well as any other device(s) that perform(s) a function in a control system. In any event, field devices may include, for example, input devices (e.g., devices such as sensors and instruments that provide status, measurement or other signals that are indicative of process control parameters such as, for example, temperature, pressure, flow rate, etc.), as well as control operators or actuators that perform actions in response to commands received from controllers and/or other field devices.

When implemented, any of the software described herein may be stored in any computer readable memory such as on a magnetic disk, a laser disk, or other storage medium, in a RAM or ROM of a computer or processor, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The invention claimed is:

1. A computer-implemented method of providing security in a process plant, the method executed by one or more processors contained in a device associated with the process plant and programmed to perform the method, the method comprising:

storing a whitelist of command types for a process control communication protocol, the whitelist of command types being stored based upon an identification of one or more of device specific commands and common practice commands supported by one or more process control field devices, such that the whitelist of command types includes one or more of device specific commands and common practice commands, and the identification being performed via a learn state of the device, wherein the device in the learn state observes incoming commands to the one or more process control field devices to identify command types of the device specific commands or common practice commands respectively supported by each of the one or more process control field devices;

receiving a message at the device via a communication interface, wherein the message conforms to the process control communication protocol and is intended for or addressed to a particular field device from among the one or more process control field devices, extracting a command type from the message, checking the extracted command type against the stored whitelist of command types for the process control communication protocol, and allowing the message when the extracted command type is contained in the whitelist of the command types for the process control communication protocol and not allowing the message when the extracted command type is not contained in the whitelist of command types for the process control communication protocol.

2. The method of claim 1, wherein receiving the message includes receiving the message at a process controller associated with a process control system within the process plant, wherein the process controller is communicatively coupled to the one or more process control field devices and performs control functions with respect to the process plant.

3. The method of claim 2, wherein allowing the message comprises enabling the process controller to forward the message to the particular field device over a communication link.

4. The method of claim 2, wherein allowing the message comprises enabling one or more logic modules within the process controller to process the message.

5. The method of claim 1, wherein receiving the message includes receiving the message at a safety logic solver associated with a process control system in the process plant, wherein the safety logic solver is communicatively coupled to one or more safety field devices and performs safety control functions with respect to the process plant.

6. The method of claim 5, wherein allowing the message comprises enabling the safety logic solver to forward the message to one or more of the safety field devices over a communication link.

7. The method of claim 5, wherein allowing the message comprises enabling one or more logic modules within the safety logic solver to process the message.

8. The method of claim 1, wherein not allowing the message comprises not forwarding the message over a communication network to another device to which the message is addressed.

9. The method of claim 1, wherein not allowing the message comprises sending a notification over a communication network that the message was not allowed.

10. The method of claim 9, wherein sending the notification includes notifying one or more of a plant operator, a maintenance personnel, and a configuration engineer that the message was not allowed.

11. The method of claim 1, wherein the process control communication protocol is a highway addressable remote transmitter (HART) communication protocol, wherein receiving the message at the device via a communication interface includes receiving a HART protocol message at the communication interface, wherein storing the whitelist of command types includes storing a whitelist of command types associated with the HART communication protocol, and wherein checking the extracted command type against the whitelist of command types includes checking the extracted command type against the whitelist of HART communication protocol command types.

12. The method of claim 1, further including storing a plurality of whitelists of command types for the process control communication protocol, and wherein checking the extracted command type against a whitelist of command types for the process control communication protocol includes selecting one of the stored whitelists of command types for the process control communication protocol as the whitelist of command types for use in comparing the extracted command type.

13. The method of claim 12, wherein selecting one of the stored whitelists includes selecting the one of the stored whitelists based on a security level associated with the device associated with the process plant.

14. The method of claim 13, further including determining the security level associated with the device associated with the process plant by determining a hardware security setting of the device associated with the process plant.

15. The method of claim 13, further including determining the security level associated with the device associated with the process plant by determining a software stored security setting of the device associated with the process plant.

16. The method of claim 1, wherein receiving the message includes receiving the message at a gateway device associated with a process control system, storing the whitelist of command types for a process control communication protocol includes storing the whitelist of command types for the process control communication protocol in the gateway device, and wherein allowing the message when the extracted command type is contained in the whitelist of the command types for the process control communication protocol includes allowing the gateway device to process and act on the message and wherein not allowing the message when the extracted command type is not contained in the whitelist of command types for the process control communication protocol includes not allowing the gateway device to process and act on the message.

17. The method of claim 1, wherein receiving the message includes receiving the message at an input/output device coupled between a process controller device and one or more of the field devices associated with a process control system within the process plant, wherein storing the whitelist of command types for a process control communication protocol includes storing the whitelist of command types for the process control communication protocol in the input/output device, and wherein allowing the message when the extracted command type is contained in the whitelist of the command types for the process control communication protocol includes forwarding the message to another device to which the message is addressed and wherein not allowing the message when the extracted command type is not contained in the whitelist of command types for the process control communication protocol includes not forwarding the message to another device to which the message is addressed.

18. A process control device, comprising:
a memory;
a whitelist of command types for a process control communication protocol stored in the memory, the whitelist of command types being stored based upon an identification of one or more of device specific commands and common practice commands supported by one or more process control field devices, such that the whitelist of command types includes one or more of device specific commands and common practice commands, the identification being performed via a learn state of the process control device, wherein the process control device in the learn state observes incoming commands to the one or more process control field devices to identify command types of the device specific commands or common practice commands respectively supported by each of the one or more process control field devices;
a communication interface adapted to be coupled to an external communication network;
a processor coupled to the communication interface; and
a whitelisting routine stored in the memory and adapted to be executed on the processor to:
extract a command type from a message received from the external communication network at the communication interface in a particular process control communication protocol, the message being intended for or addressed to a particular field device from among the one or more process control field devices,
check the extracted command type against the whitelist of command types for the process control communication protocol, and
allow the message when the extracted command type is contained in the whitelist of the command types for the process control communication protocol and not allow the message when the extracted command type is not contained in the whitelist of command types for the process control communication protocol.

19. The process control device of claim 18, wherein process control device is a process controller that is communicatively coupled to one or more of the process control field devices and performs control functions with respect to a process plant.

20. The process control device of claim 18, wherein the process control device is a safety logic solver that is communicatively coupled to one or more safety related process control field devices and performs safety related control functions with respect to a process plant.

21. The process control device of claim 18, wherein the process control device is an input/output device communicatively coupled between a process controller and one or more of the process control field devices within a process plant.

22. The process control device of claim 18, wherein the process control device is a gateway device coupled between two process control communication networks in the process plant.

23. The process control device of claim 18, wherein the whitelisting routine allows the message by forwarding the message to the particular field device to which the message is intended or addressed via a communication network and does not allow the message by not forwarding the message to the particular field device to which the message is addressed via any communication network.

24. The process control device of claim 18, further including one or more logic modules stored in the memory and wherein the whitelist routine allows the message by enabling the one or more logic modules to execute on the processor to process the message and does not allow the message by not allowing the one or more logic modules to execute on the processor to process the message.

25. The process control device of claim 18, wherein the whitelist routine sends a notification over the external communication network that the message was not allowed when the message is not allowed.

26. The process control device of claim 25, wherein the whitelist routine sends the notification to one or more of a plant operator, a maintenance personnel, and a configuration engineer that the message was not allowed.

27. The process control device of claim 18, wherein the process control communication protocol is a highway addressable remote transmitter (HART) communication protocol.

28. The process control device of claim 18, further including a plurality of different whitelists of command types for the process control communication protocol stored in the memory and wherein and the whitelist routine further selects one of the stored whitelists of command types for the process control communication protocol as the whitelist to use to check the extracted command type.

29. The process control device of claim 28, wherein the whitelist routine selects the one of the stored whitelists as the whitelist to use based on a security level associated with the process control device.

* * * * *